United States Patent
Hieda et al.

(10) Patent No.: US 6,631,216 B2
(45) Date of Patent: *Oct. 7, 2003

(54) IMAGE INTERPOLATION APPARATUS

(75) Inventors: Teruo Hieda, Yokohama (JP); Ken Terasawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,225

(22) Filed: Jul. 29, 1998

(65) Prior Publication Data

US 2001/0043760 A1 Nov. 22, 2001

(30) Foreign Application Priority Data

Jul. 31, 1997 (JP) .............................. 9-206098
Jul. 31, 1997 (JP) .............................. 9-206099

(51) Int. Cl.[7] .............................. G06K 9/32; H04N 1/46; H04N 5/08; G06T 11/00
(52) U.S. Cl. ........................ 382/300; 358/525; 348/538; 345/472
(58) Field of Search .............................. 382/300, 298, 382/299, 295, 293, 291, 286, 284, 282, 305; 358/1.2, 525, 537, 538, 428; 348/441, 538; 345/428, 472, 606

(56) References Cited

U.S. PATENT DOCUMENTS

| 4,578,812 A | | 3/1986 | Yui .............................. 382/41 |
| 4,774,581 A | | 9/1988 | Shiratsuchi ................. 358/180 |
| 5,029,017 A | * | 7/1991 | Abe et al. |
| 5,048,105 A | * | 9/1991 | Adachi ........................ 382/47 |
| 5,126,843 A | * | 6/1992 | Tanaka ....................... 358/138 |
| 5,181,110 A | * | 1/1993 | Katsumata et al. ......... 358/140 |
| 5,280,365 A | * | 1/1994 | Nannichi et al. ........... 358/451 |
| 5,737,101 A | * | 4/1998 | Ito .............................. 358/525 |
| 5,847,714 A | | 12/1998 | Naqvi et al. ................ 345/439 |
| 5,852,470 A | * | 12/1998 | Kondo et al. ............... 348/448 |
| 5,930,407 A | * | 7/1999 | Jensen ........................ 382/300 |
| 6,018,597 A | * | 1/2000 | Maltsev et al. ............. 382/260 |

FOREIGN PATENT DOCUMENTS

| JP | 5-83612 | 4/1993 |
| JP | 07-038804 | 2/1995 |
| JP | 07-110859 | 4/1995 |
| JP | 07-131692 | 5/1995 |

OTHER PUBLICATIONS

Toshiro Kinugasa et al., "An Electronic Zoom Video Camera Using Imager Scanning Control," IEEE Transactions on Consumer Electronics, US, IEEE Inc., New York, vol. 37, NR. 3, pp. 501–504.

* cited by examiner

*Primary Examiner*—Bhavesh M. Mehta
*Assistant Examiner*—Yosef Kassa
(74) *Attorney, Agent, or Firm*—Fitzpatrick, Cella, Harper & Scinto

(57) ABSTRACT

For enabling image enlargement or reduction of high image quality with improved definition, there is disclosed an image interpolating device comprising a memory for storing digital image signal, memory readout means for reading pixel data in succession from the memory, first, second and third consecutive delay means for respectively delaying the image signal $S_n$, read by the memory readout means, to respectively from pixel signals $S_{n-1}$, $S_{n-2}$, $S_{n-3}$, first, second, third and fourth coefficient generation circuits for generating interpolation coefficients respectively corresponding to the pixel signals $S_n$, $S_{n-1}$, $S_{n-2}$, $S_{n-3}$ and determined by N-th order functions from the position of the interpolated pixel S' positioned between the pixel signals $S_{n-1}$ and $S_{n-2}$, and a signal synthesis circuit for calculating the sum of respective product of pixel signal $S_n$ and interpolation coefficient $k_n$.

20 Claims, 19 Drawing Sheets

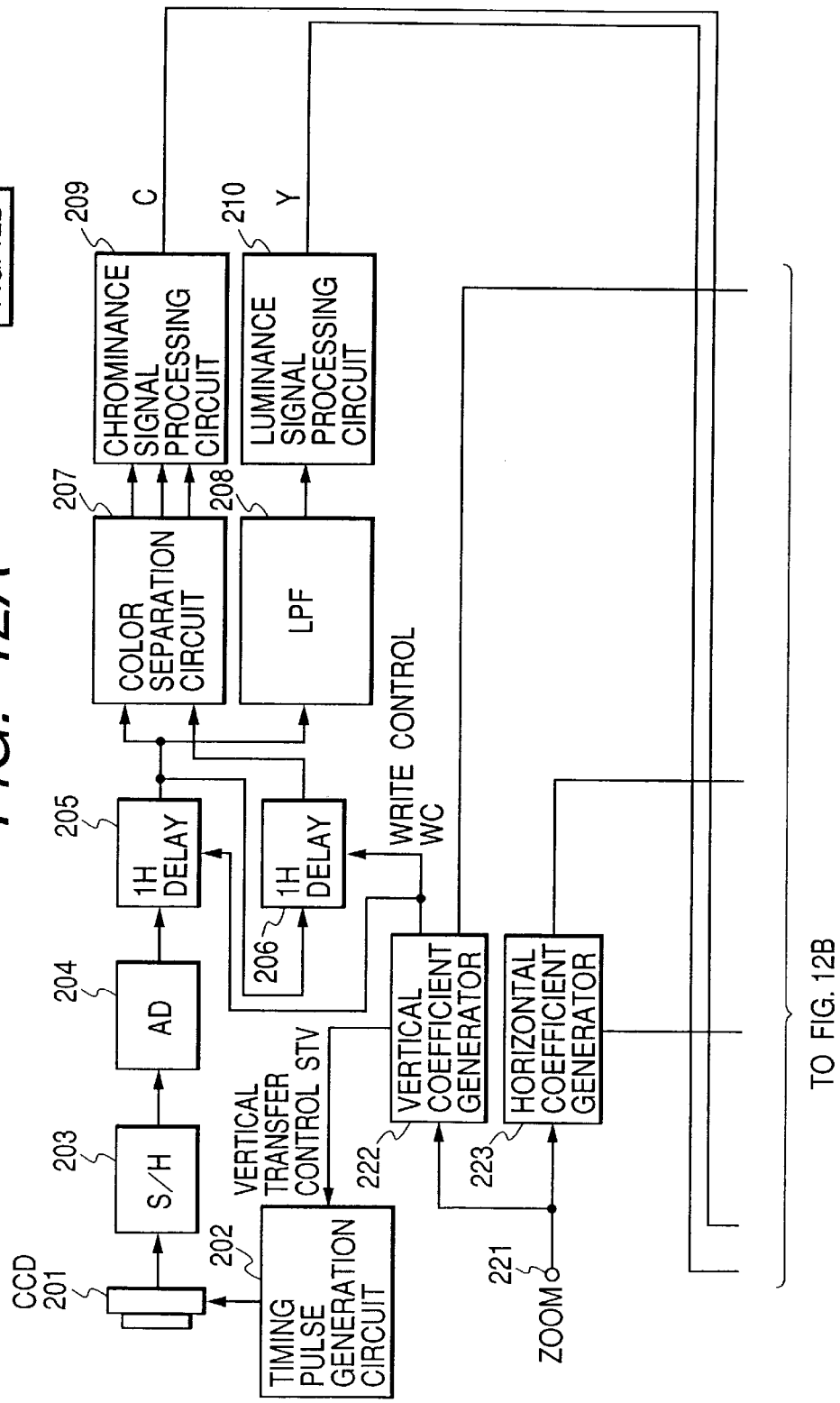

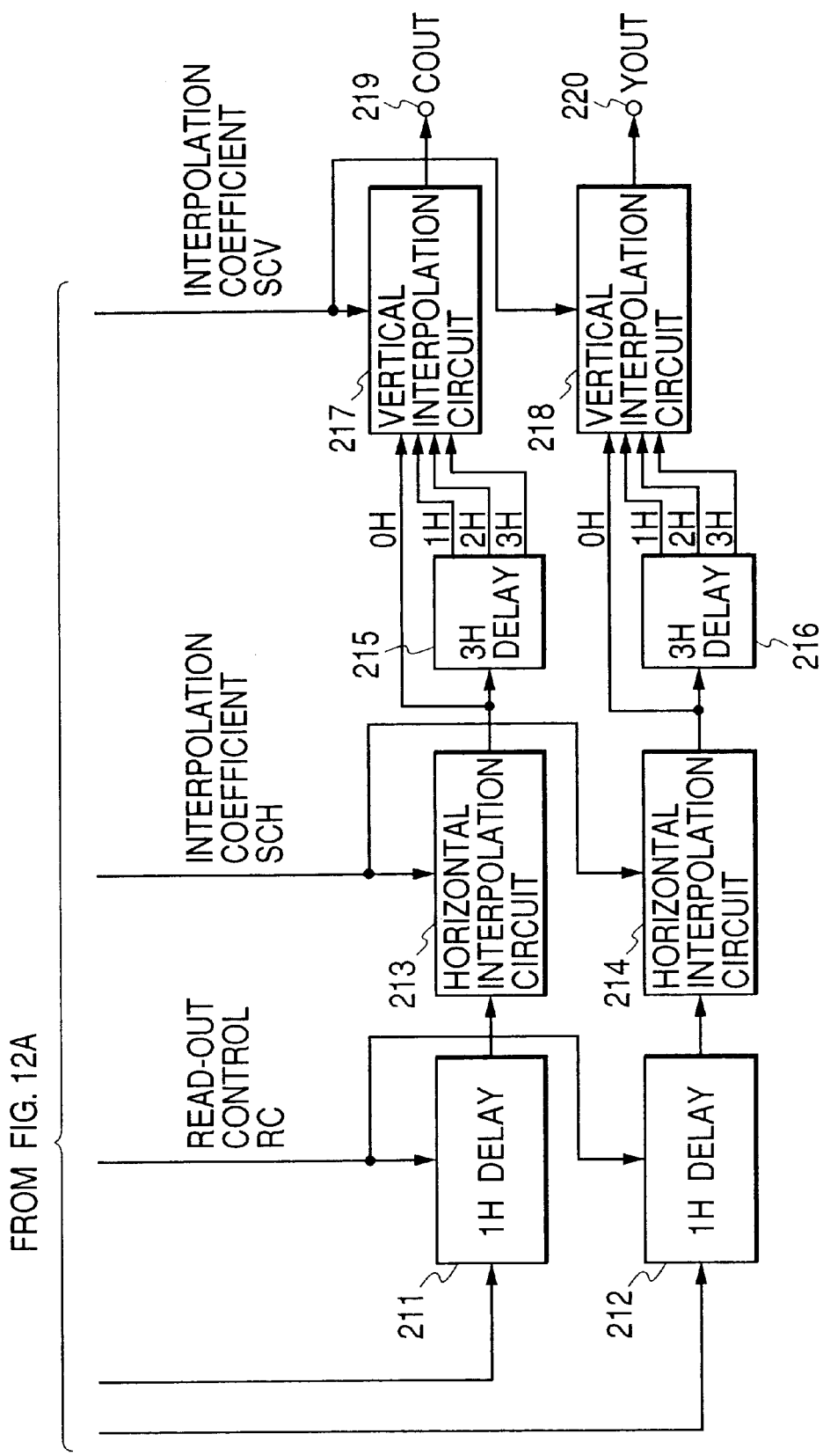

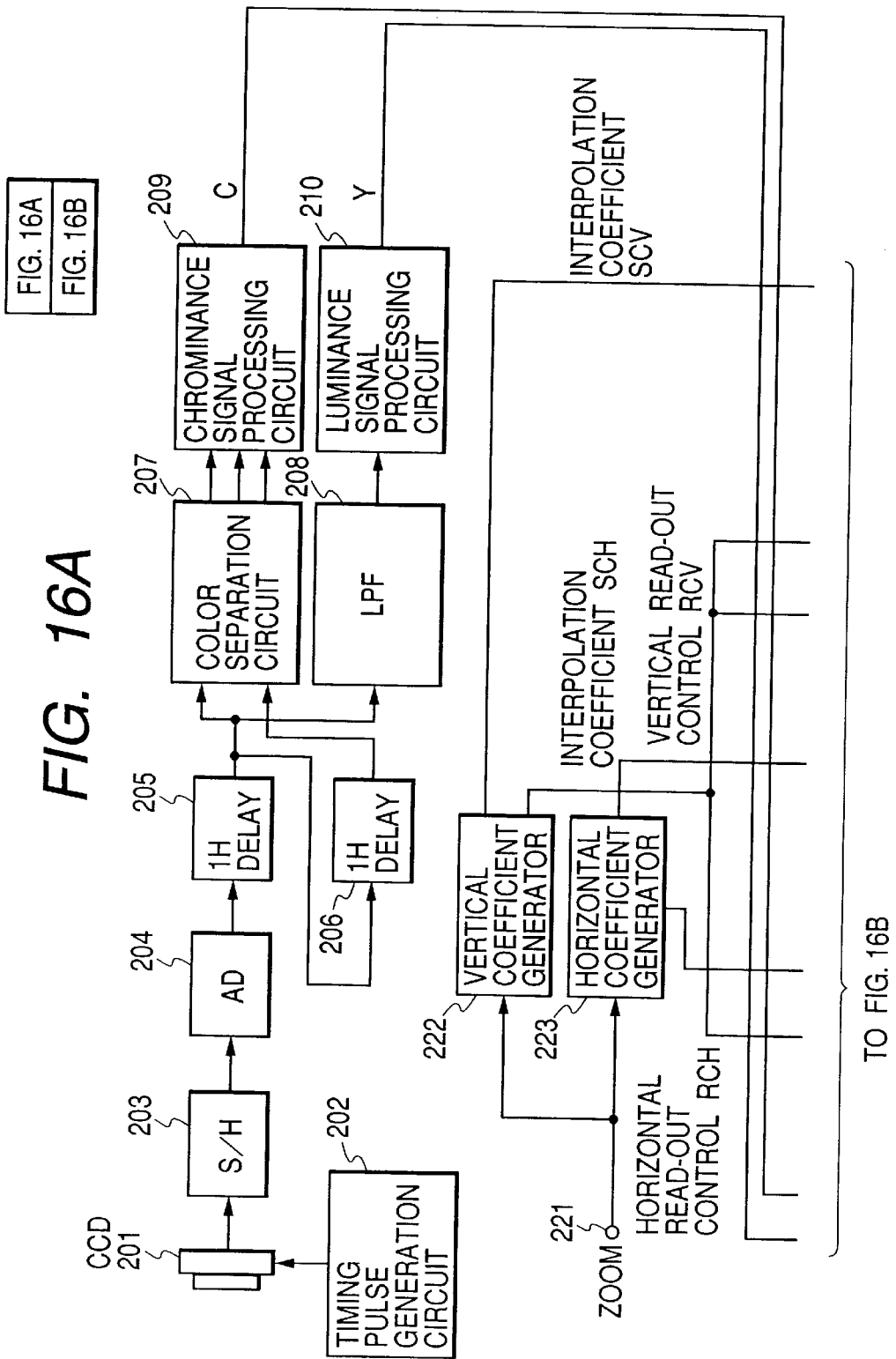

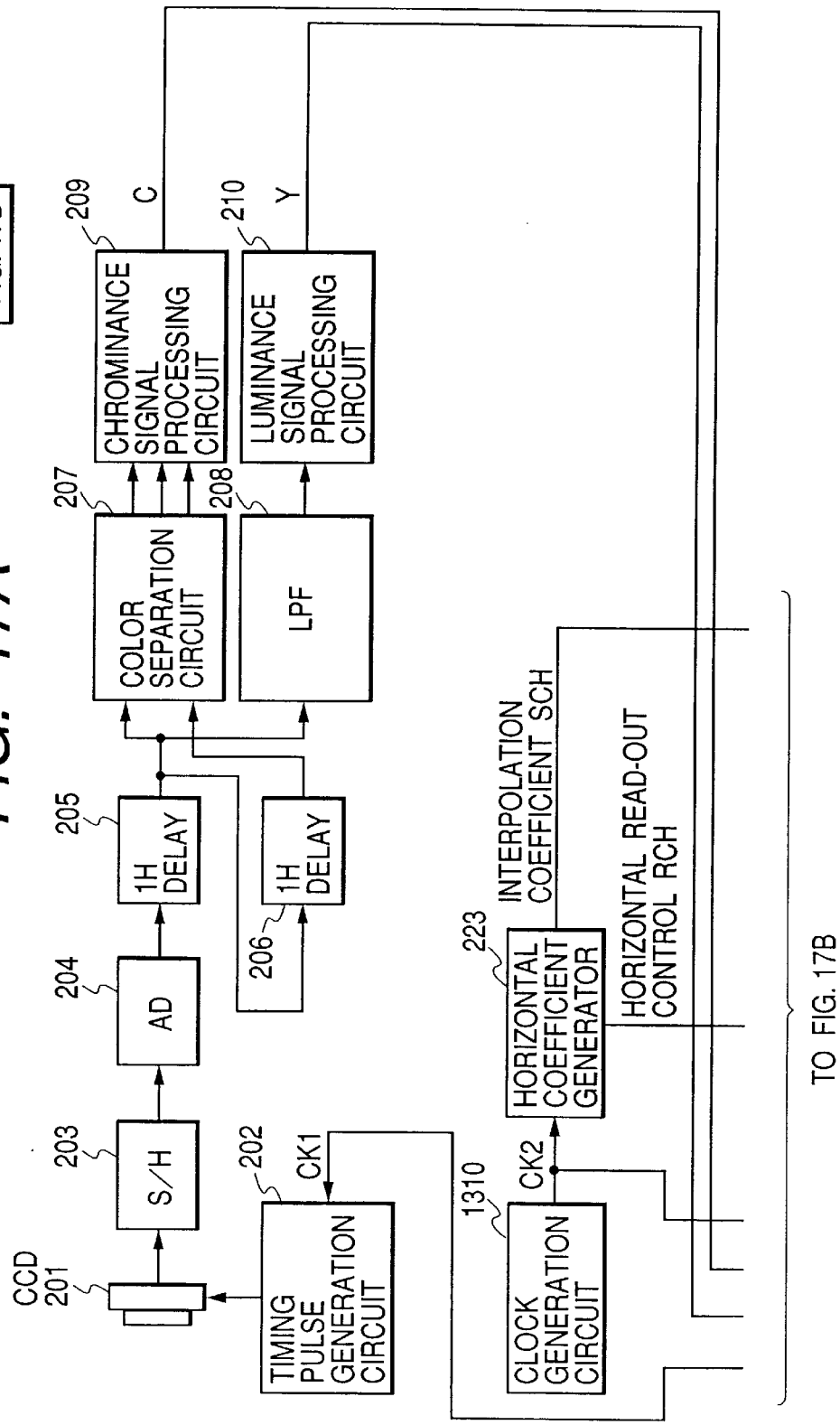

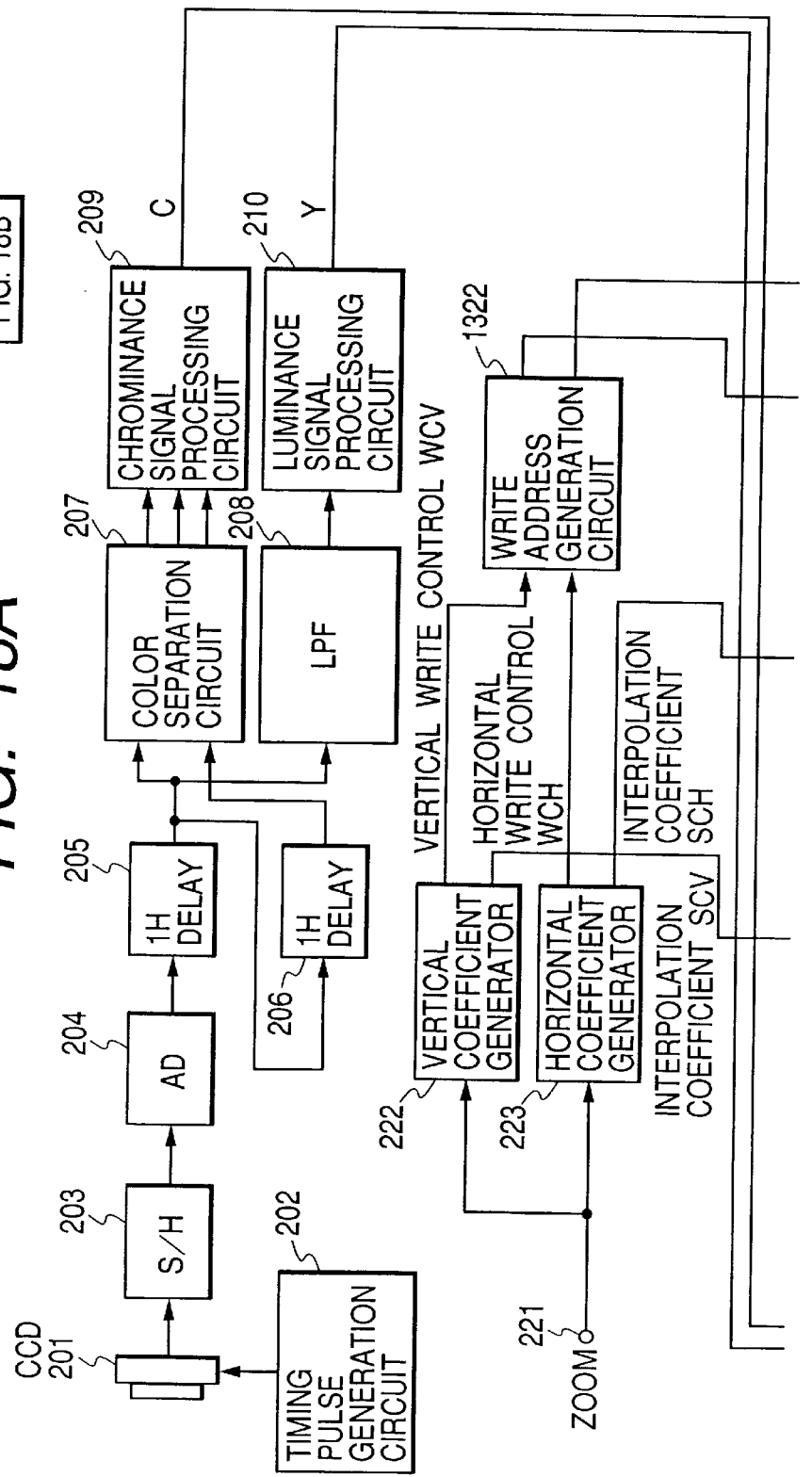

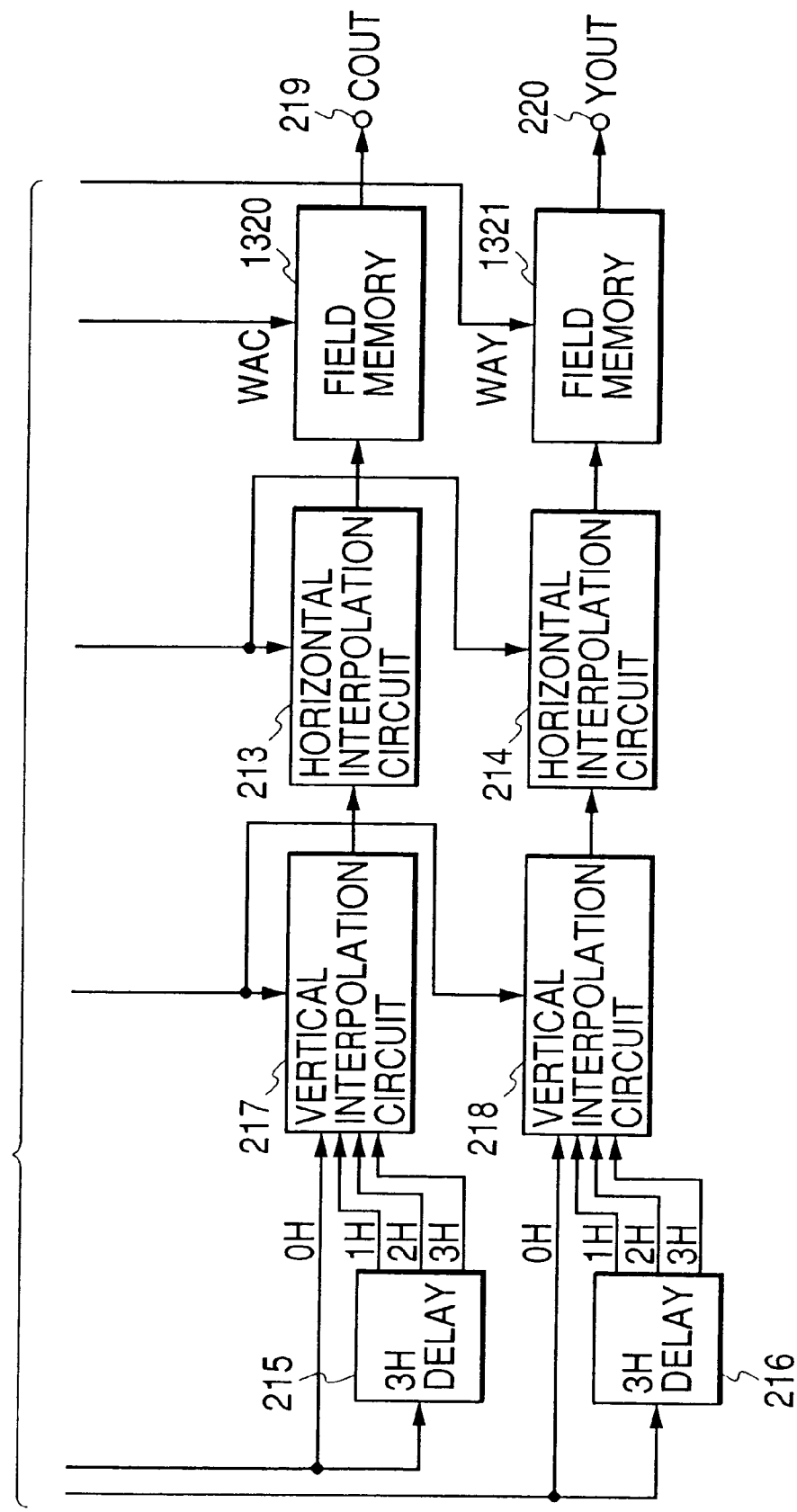

IMAGE INTERPOLATION APPARATUS

BACKGROUND OF THE INVENTION

1. Field of the Invention

The present invention relates to an image interpolating apparatus adapted for use in a digital camera or the like.

2. Related Background Art

Recent progress in the digital signal processing technology has greatly contributed to the expansion of the imaging. The emergence of digital recording media such as digital video camera and digital still camera has realized an environment where the recording, editing and working of image data can be easily achieved with high image quality by the personal computer or the like.

In such environment, the technology of image reduction and enlargement on real time basis within the image pickup apparatus itself is anticipated to become more and more important in the future.

The conventional digital video cameras are usually provided with a function of so-called electronic zooming, for enlarging the picked-up image by interpolation, in order to obtain an image enlarged beyond the optical zooming. There can also be achieved other processes such as electronic zoom-out for obtaining a reduced image.

In case of linearly interpolating continuous image data, obtained by sampling with a certain sampling frequency, with a sampling pitch of another sampling frequency, there is required a relative positional data k indicating the relative relationship in time between the original pixel data adjacent to an interpolated pixel and such interpolated pixel.

For obtaining such data in continuous manner, there is known a method of employing memory readout means utilizing an accumulator as disclosed in the U.S. Pat. No. 4,774,581.

FIG. 1 is a schematic view showing a part of the image of a field, stored in a field memory, wherein $S_n$ and $S_{n-1}$ indicate stored pixel data and S' indicates data of the interpolated pixel.

In the illustrated situation, the relationship of $S_n$, $S_{n-1}$ and S' is represented by:

$$S'=S_n \cdot k + S_{n-1} \cdot (1-k).$$

In order to achieve this calculation with a digital circuit, with a reduced number of multipliers, this equation is modified as:

$$S'=(S_n-S_{n-1}) \cdot k + S_{n-1}.$$

FIG. 2 shows an example of the electronic zoom in the horizontal direction in the conventional linear interpolation as disclosed in the Japanese Patent Application Laid-Open No. 5-83612, wherein a field memory 1 receives, through an input terminal, the image signal outputted with a sampling frequency determined by the image pickup element and stores the image data of a field.

Memory readout means 2 receives a zoom ratio set value "zoom" from a microcomputer 3, correspondingly determines the position of the interpolated pixel in continuous manner and sends a readout control signal Cr to the field memory 1 in such a manner that, the pixel data $S_n$ immediately after the position of the interpolated pixel, among the original image data stored in the field memory, is output at the determined position of the interpolated pixel.

Based on the readout control signal Cr from the memory readout means 2 and the zoom ratio setting value "zoom" from the microcomputer 3, a coefficient generation circuit 4 supplies a linear interpolation circuit 6 with a relative positional data k indicating the relationship in time between the interpolated pixel S' and the original sampling pixel data $S_n$ positioned immediately behind the interpolated pixel S'.

The field memory 1 outputs the pixel data $S_n$ instructed by the signal Cr while delay means 5 outputs a pixel data $S_{n-1}$ delayed by a clock of the original sampling frequency, and both data are simultaneously entered at a time to the linear interpolation circuit 6.

The linear interpolation circuit 6 executes the calculation:

$$S'=(S_n-S_{n-1}) \cdot k + S_{n-1}$$

according to the foregoing linearly interpolating equation, utilizing a subtractor 61, a multiplier 62 and an adder 63, to output an interpolated pixel data S'.

The conventional linear interpolation utilizing the two adjacent pixels as explained in the foregoing simplifies the circuit configuration but the image is reduced or enlarged without improvement in definition, since the frequency characteristics are monotonously sloped as shown in FIG. 6.

SUMMARY OF THE INVENTION

The object of the present invention is to provide an image enlargement/reduction circuit capable of attaining high image quality with improvement in image definition, with a simple circuit configuration, and an image pickup apparatus utilizing such circuit.

The above-mentioned object can be attained, according to a first aspect of the present invention, by an image interpolation apparatus comprising a memory for storing digital image signal; memory readout means for reading pixel data in succession from the memory; consecutive first, second and third delay means for respectively delaying the image signal $S_n$, read by the memory readout means, to form pixel signals $S_{n-1}$, $S_{n-2}$, $S_{n-3}$; first, second, third and fourth coefficient generation circuits for generating interpolation coefficients $k_1$, $k_2$ respectively corresponding to the pixel signals $S_n$, $S_{n-1}$, $S_{n-2}$, $S_{n-3}$ and determined by N-th order functions from the position of the interpolated pixel S' positioned between the pixel signals $S_{n-1}$ and $S_{n-2}$; and a signal synthesis circuit for calculating the sum of respective product of pixel signal $S_n$ and interpolation coefficient $k_n$.

According to a second aspect of the present invention there is provided an image interpolation apparatus comprising a memory for storing digital image signal; memory readout means for reading pixel data in succession from the memory; first, second and third consecutive delay means for respectively delaying the image signal, read by the memory readout means, to respectively form pixel signals $S_{n-1}$, $S_{n-2}$, $S_{n-3}$; first and second coefficient generation circuits for generating interpolation coefficients $k_1$, $k_2$ determined by N-th order functions from the position of the interpolated pixel S' positioned between the pixel signals $S_{n-1}$ and $S_{n-2}$; first and second interpolation circuits for executing a calculation $P=k_1 \cdot S_x + (1-k_1) \cdot S_y$ on two arbitrary pixel signals $S_x$, $S_y$; and a signal synthesis circuit; wherein the pixel signals $S_n$, $S_{n-3}$ are entered into the first interpolation circuit while the pixel signals $S_{n-1}$, $S_{n-2}$ are entered into the second interpolation circuit and the first and second interpolation circuits execute interpolation with the interpolation coefficient $k_1$, while the outputs $P_n$, $P_{n-1}$ of the first and second interpolation circuits are entered into the signal synthesis circuit, which outputs the interpolated pixel signal S' based on an equation $k_2 \cdot (P_{n-1}-P_n)+P_{n-1}$ utilizing the interpolation coefficient $k_2$.

According to a third aspect of the present invention there is provided an image interpolation apparatus comprising a memory for storing digital image signal; memory readout means for reading pixels in succession in the horizontal direction from the memory; consecutive first, second and third delay means for respectively delaying the image signal read by the memory readout means; a coefficient generation circuit for determining, by an accumulator, an interpolation coefficient k indicating the position of the interpolated pixel S' positioned between the pixel signals $S_{n-1}$ and $S_{n-2}$ based on the current pixel signal $S_n$ read by the memory readout means, the pixel signal $S_{n-1}$ from the first delay means, the pixel signal $S_{n-2}$ from the second delay means and the pixel signal $S_{n-3}$ from the third delay means; first and second interpolation circuits for executing a calculation $P=k_1 \cdot S_x + (1-k) \cdot S_y$ on two arbitrary pixel signals $S_x$, $S_y$, and a signal synthesis circuit, wherein the pixel signals $S_n$, $S_{n-3}$ are entered into the first interpolation circuit while the pixel signals $S_{n-1}$, $S_{n-2}$ are entered into the second interpolation circuit and the first and second interpolation circuits execute interpolation with the interpolation coefficient k, while the outputs $P_n$, $P_{n-1}$ of the first and second interpolation circuits are entered into the signal synthesis circuit, which outputs the interpolated pixel signal S' based on an equation $M \cdot (P_{n-1}-P_n)+P_{n-1}$ in which M is a coefficient derived from the interpolation coefficient k by $M=k \cdot (1-k)$.

According to the first and second aspects of the present invention, in image enlargement/reduction in the vertical/horizontal directions on real-time basis in a real-time process such as the electronic zooming or zoom-out process, an enlarged or reduced image of desired frequency characteristics with improved definition can be obtained by an interpolation circuit of simple circuit configuration.

Also according to a third aspect of the present invention, in image enlargement/reduction in the vertical/horizontal directions on real-time basis in a real-time process such as the electronic zooming or zoom-out process, the image definition can be significantly improved by an interpolation circuit of a simple circuit configuration.

The image memory may be composed of a field memory, or a frame memory for further improving the resolution in the vertical direction, in case the image data are obtained for example with a progressive scan CCD.

According to a fourth aspect of the present invention, there is provided an image pickup apparatus comprising an image pickup element and an image processing unit capable of enlarging or reducing the image, outputted from the image pickup element, in at least one of the horizontal and vertical directions, wherein the enlargement or reduction executed in the image processing unit is, based on the image data of four pixels adjacent in the horizontal or vertical direction, to obtain interpolated image data of a position between these pixels.

According to the fourth aspect, in enlarging or reducing the image, outputted from the image pickup element, in at least one of the horizontal and vertical directions, the image data of four pixels are used to obtain interpolated image data of a position between such four pixels, thereby providing an enlarged or reduced image with excellent frequency characteristics and with very little deterioration in image quality.

Furthermore, in generating interpolated data based on the image data of four points, taking data D0, D1, D2 and D3 of four adjacent pixels, wherein the position to be interpolated is located between D1 and D2 and a coefficient K is defined by the distance from such position to D1 divided by the distance between D1 and D2, there are at first calculated two average values weighted with K and (1−K) respectively for the former and latter data in each of two combinations of D0, D3 and D1, D2 and these two average values are used for determining the image data at the above-mentioned interpolated position. This method significantly facilitates the realization in hardware, as the image data can be obtained solely by integral calculation.

Other objects of the present invention, and the features thereof, will become fully apparent from the following description which is to be taken in conjunction with the attached drawings.

BRIEF DESCRIPTION OF THE DRAWINGS

FIG. 12 which is composed of FIGS. 12A and 12B are block diagrams showing a fifth embodiment of the present invention;

FIG. 18 which is composed of FIGS. 18A and 18B are block diagrams showing a fourth embodiment of the present invention.

DETAILED DESCRIPTION OF THE PREFERRED EMBODIMENTS

Figure 1:
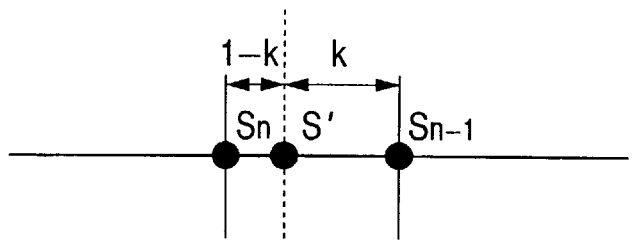
FIG. 1 is a schematic view showing the concept of linear interpolation.
Figure 2:
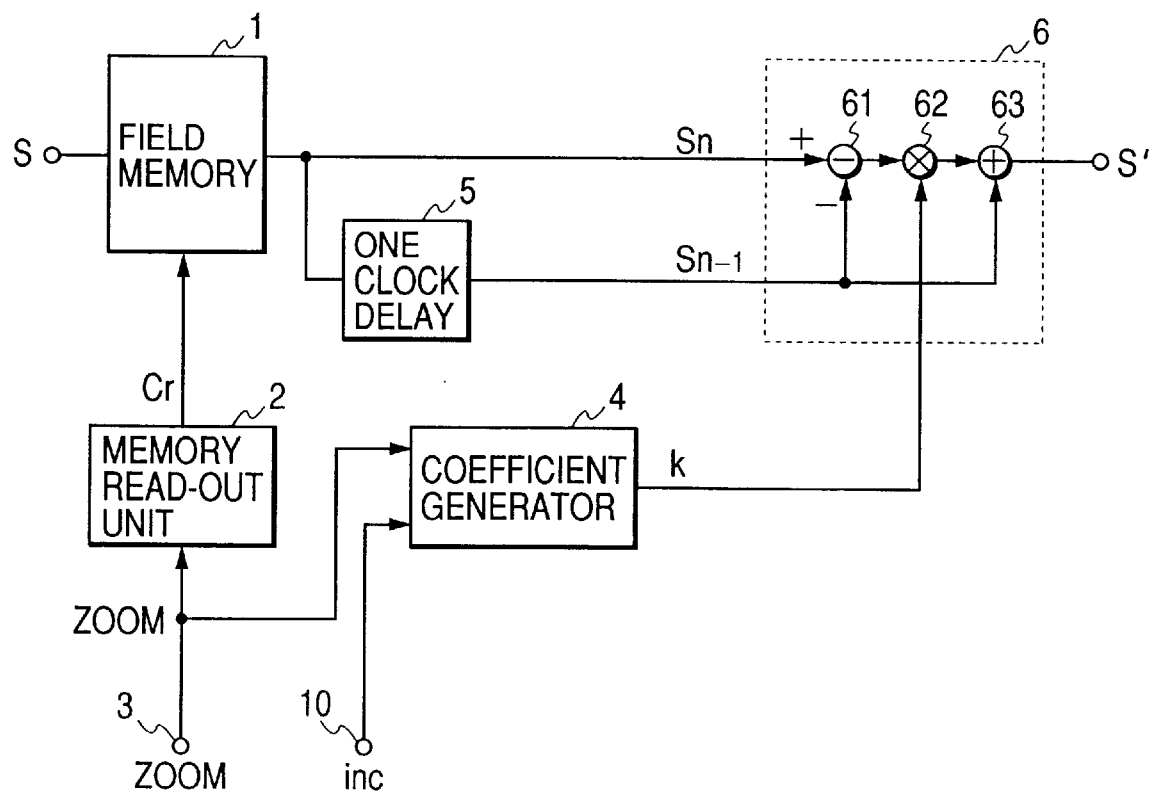
FIG. 2 is a block diagram showing a conventional configuration.
Figure 3:
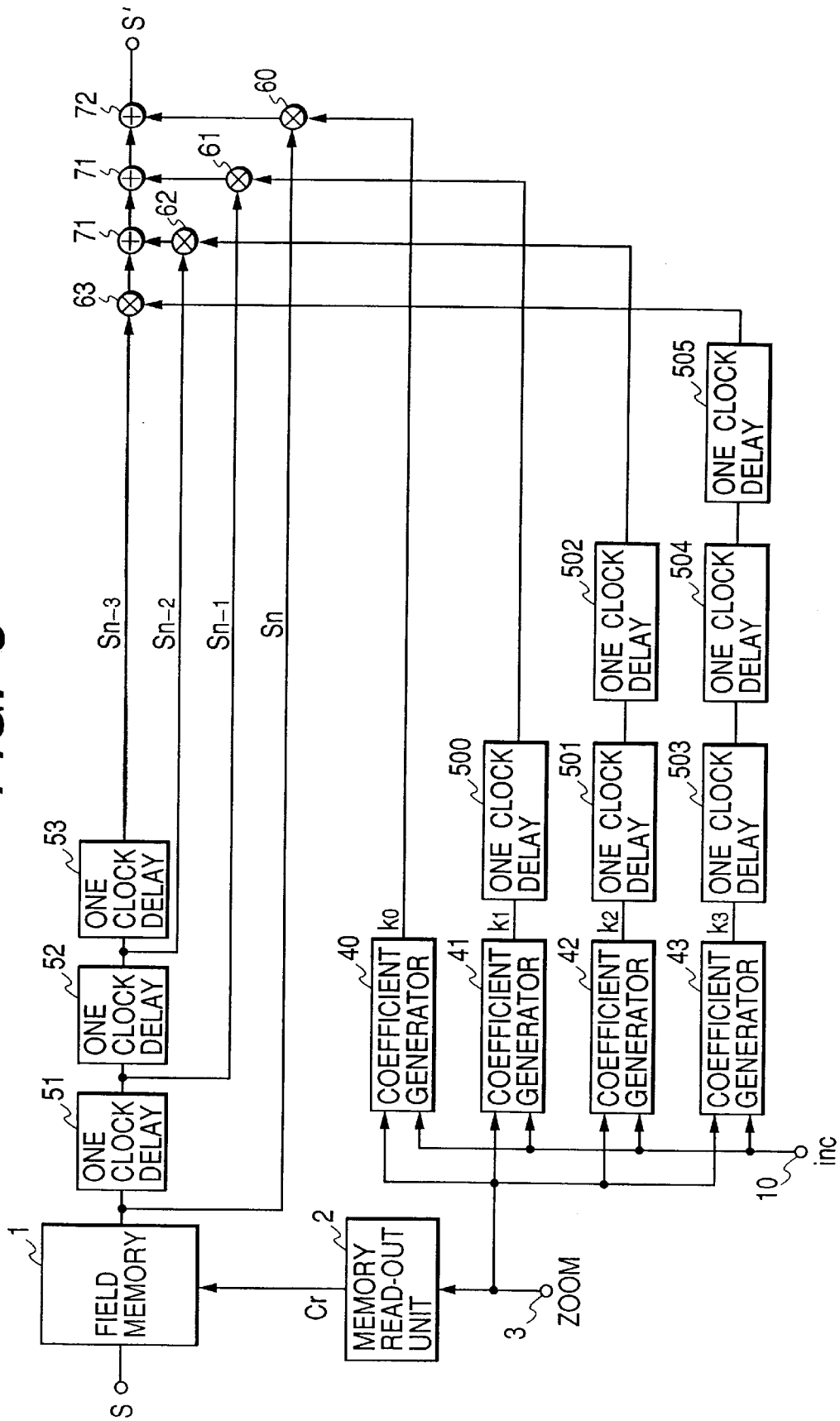
FIG. 3 is a block diagram showing a first invention.

In the following there will be explained a first embodiment of the present invention. FIG. 3 shows an example of high image quality interpolation utilizing four close points in the horizonal direction.

Figure 5A:
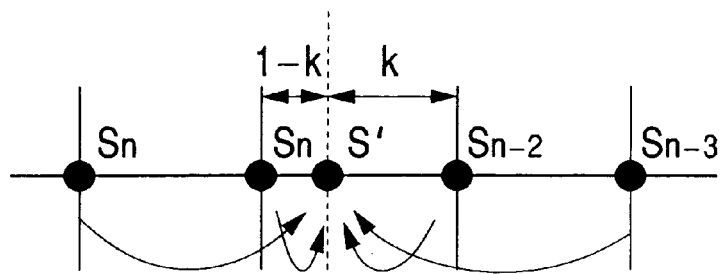
FIG. 5A is a schematic view showing the concept of horizontal interpolation according to the present invention.

FIG. 5A is a view schematically showing a part of the image of a field stored in a field memory, which receives the image signal, outputted with a sampling frequency determined by the image pickup element from an input terminal and stores the image data of one field.

The zoom ratio setting value "zoom" defines the zoom ratio R by $$R=256/(256+\text{zoom})$$

in case the zooming has a resolving power of 8 bits. The image is reduced or enlarged respectively when zoom assumes a positive integral value or a negative integral value.

Memory readout means 2 receives the zoom ratio setting value "zoom" from a zoom setting input terminal 3, accordingly determines the position of the interpolated pixel in a continuous manner, and supplies a field memory 1 with a readout control signal Cr in such a manner that image data $S_n$ immediately after the position of the interpolated pixel is outputted among the original image data stored in the field memory.

Figure 11:
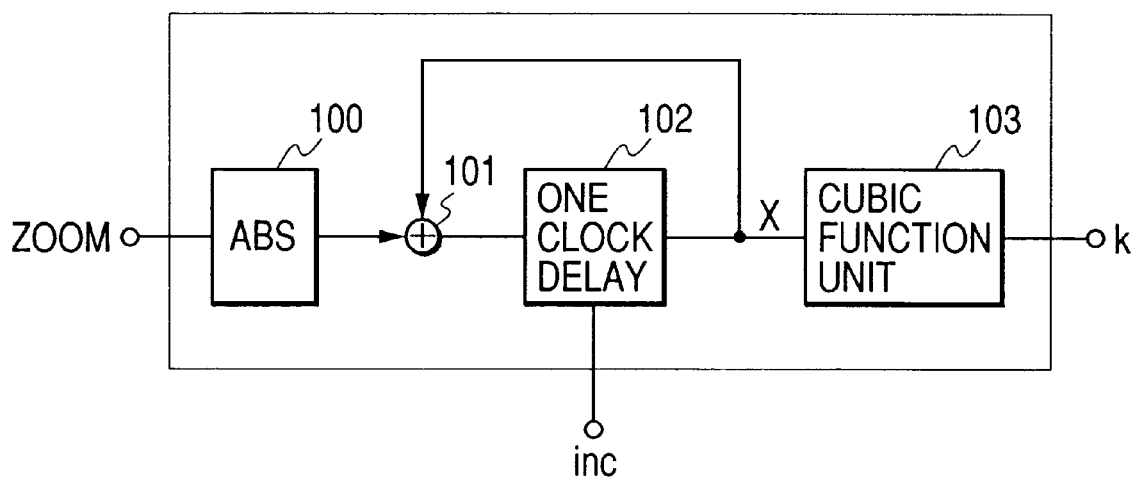
FIG. 11 is a circuit diagram showing an example of the coefficient generator of the first and second inventions.

Also based on the zoom ratio setting value "zoom", coefficient generation circuits 40, 41, 42, 43 constructed as shown in FIG. 11 respectively generate interpolation coefficients $k_0$, $k_1$, $k_2$, $k_3$ respectively corresponding to the original sampling pixel data $S_n$, $S_{n-1}$, $S_{n-2}$, $S_{n-3}$.

In FIG. 11, there are provided an ABS (absolute value) circuit 100, an adder 101, a clock delay circuit 102 and a third-order function generation means 103 to be explained later.

These interpolation coefficients are obtained by processing the time characteristics, obtained by Fourier transform of an interpolation filter of desired frequency characteristics, for example with the following third-order function:

$$k=aX^3+bX^2+cX+d$$

wherein X is the distance between the position of the original sampling pixel data and the position of the interpolated pixel data.

Each of the coefficient generation circuits updates the interpolation coefficient $k_0$, $k_1$, $k_2$ or $k_3$ based on the distance between the position of the next original sampling pixel data and that of the interpolated pixel data, only at the upshift of a renewal control signal inc for the original sampling pixels for generating the interpolated pixel.

The interpolation coefficients $k_0$, $k_1$, $k_2$, $k_3$ obtained in this manner are matched in time by delay means 500-505, then respectively multiplied with the corresponding original sampling pixel data $S_n$, $S_{n-1}$, $S_{n-2}$, $S_{n-3}$ by multipliers 60, 61, 62, 63 and are summed by adders 70, 71, 72 to obtain the interpolated pixel data S'.

Thus obtained vertical interpolation pixel data S' maintaining the desired frequency characteristics, can provide an enlarged or reduced image with improved definition. Also the delay means 500-505 may be suitably simplified.

Figure 4:
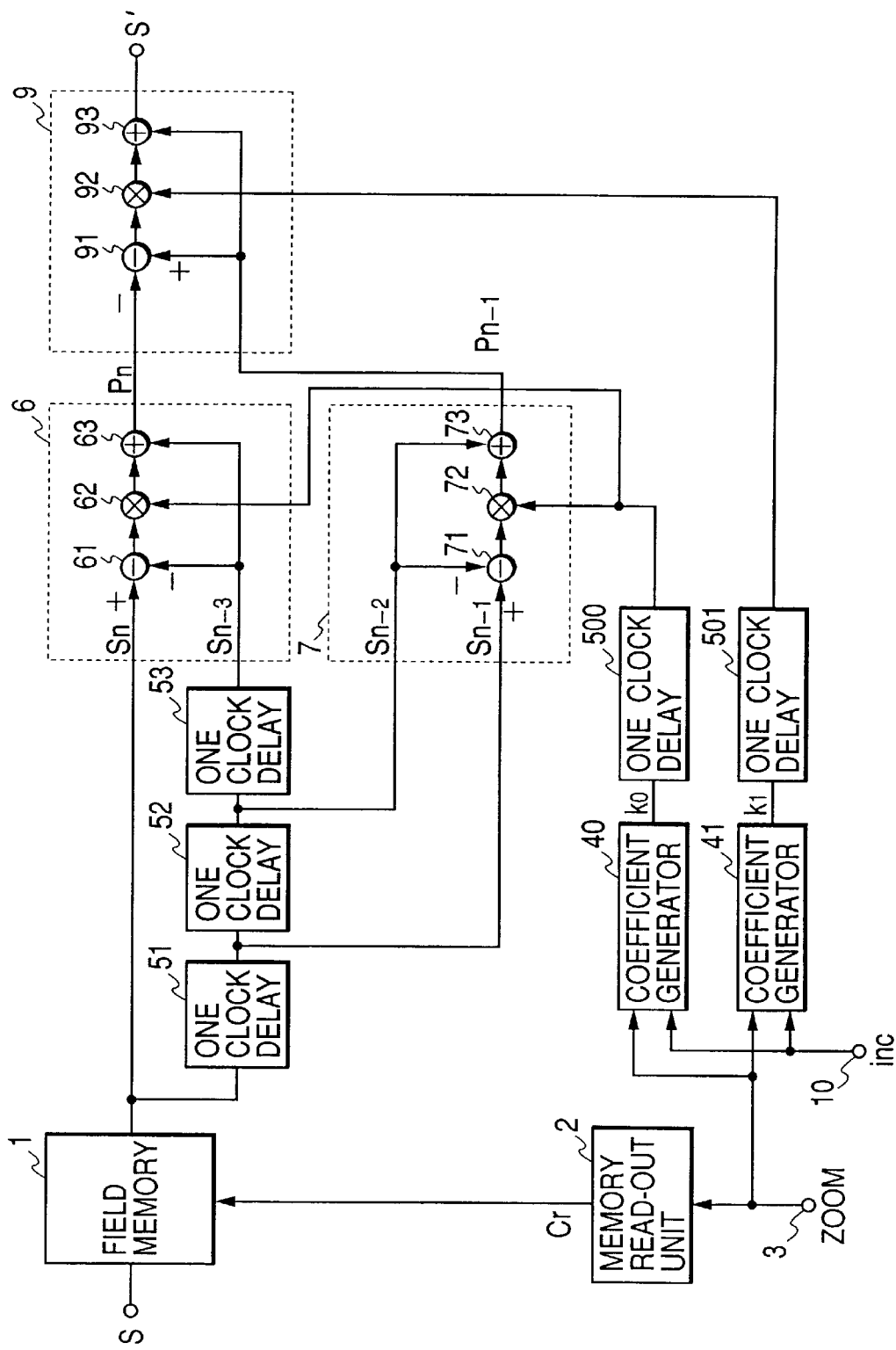
FIG. 4 is a block diagram showing a second invention.

In the following there will be explained a second embodiment of the present invention, of which configuration is shown in FIG. 4 showing an example of high image quality interpolation utilizing four close points in the horizontal direction.

FIG. 5A is a view schematically showing a part of the image of a field stored in a field memory, which receives the image signal, outputted with a sampling frequency determined by the image pickup element from an input terminal and stores the image data of one field.

The zoom ratio setting value "zoom" defines the zoom ratio R by $$R=256/(256+\text{zoom})$$

in case the zooming has a resolving power of 8 bits. The image is reduced or enlarged respectively when "zoom" assumes a positive integral value or a negative integral value.

Memory readout means 2 receives the zoom ratio setting value "zoom" from a zoom setting input terminal 3, accordingly determines the position of the interpolated pixel in continuous manner, and supplies a field memory 1 with a readout control signal Cr in such a manner that image data $S_n$ immediately after the position of the interpolated pixel, among the original image data stored in the field memory, is outputted.

Also based on the zoom ratio setting value "zoom", coefficient generation circuits 40, 41 constructed as shown in FIG. 11 respectively generate interpolation coefficients $k_0$, $k_1$ respectively corresponding to interpolation circuits 6, 7 and a signal synthesis circuit 9.

These interpolation coefficients $k_0$, $k_1$ are obtained by processing the time characteristics, obtained by Fourier transform of an interpolation filter of desired frequency characteristics, for example with the following third-order function:

$$k=aX^3+bX^2+cX+d$$

and collecting the terms suitable for hardware formation, wherein X is the distance between the position of the original sampling pixel data and the position of the interpolated pixel data.

Each of the coefficient generation circuits updates the interpolation coefficient $k_0$ or $k_1$ based on the distance between the position of the next original sampling pixel data and that of the interpolated pixel data, only at the upshift of a renewal control signal inc for the original sampling pixels for generating the interpolated pixel.

The interpolation coefficients $k_0$, $k_1$, obtained from the coefficient generation circuits 40, 41 are delayed by delay means 500, 501 by a clock period of the original sampling frequency so as to correspond to the original sampling pixel data $S_n$.

The field memory 1 outputs the pixel data $S_n$ designated by Cr, while the serial delay means 51, 52, 53 outputs pixel data $S_{n-1}$, $S_{n-2}$, $S_{n-3}$ obtained by delaying the pixel data $S_n$ in succession by a clock internal of the original sampling frequency, and the data $S_n$, $S_{n-3}$ are simultaneously supplied at a certain timing to the first interpolation circuit 6, while the data $S_{n-1}$, $S_{n-2}$ are simultaneously supplied to the second interpolation circuit 7. The interpolation coefficient $k_0$, delayed by a clock interval of the original sampling frequency, is also entered at the same time.

The interpolation circuit 6 executes a calculation:

$$P_n=(S_{n-3}-S_n)\cdot k_0+S_{n-3}$$

by a subtractor 61, a multiplier 62 and an adder 63 to output $P_n$, while the interpolation circuit 7 executes a calculation:

$$P_{n-1}=(S_{n-1}-S_{n-2})\cdot k_0+S_{n-2}$$

by a subtractor 71, a multiplier 72 and an adder 73 to output $P_{n-1}$.

$P_n$ and $P_{n-1}$ are simultaneously entered into a signal synthesis circuit 9 at a certain timing. At the same time, the interpolation coefficient $k_1$, delayed by a clock interval of the original sampling frequency, is entered into the signal synthesis circuit 9.

The signal synthesis circuit 9 executes a calculation:

$$S'=(P_{n-1}-P_n)\cdot k_1+P_{n-1}$$

by a subtractor 91, a multiplier 92 and an adder 93 to output an interpolated pixel data S'.

Thus obtained vertical interpolation pixel data S', maintaining the desired frequency characteristics, can provide an enlarged or reduced image with improved definition. Also the delay means 500, 501 may be suitably simplified.

Figure 8:
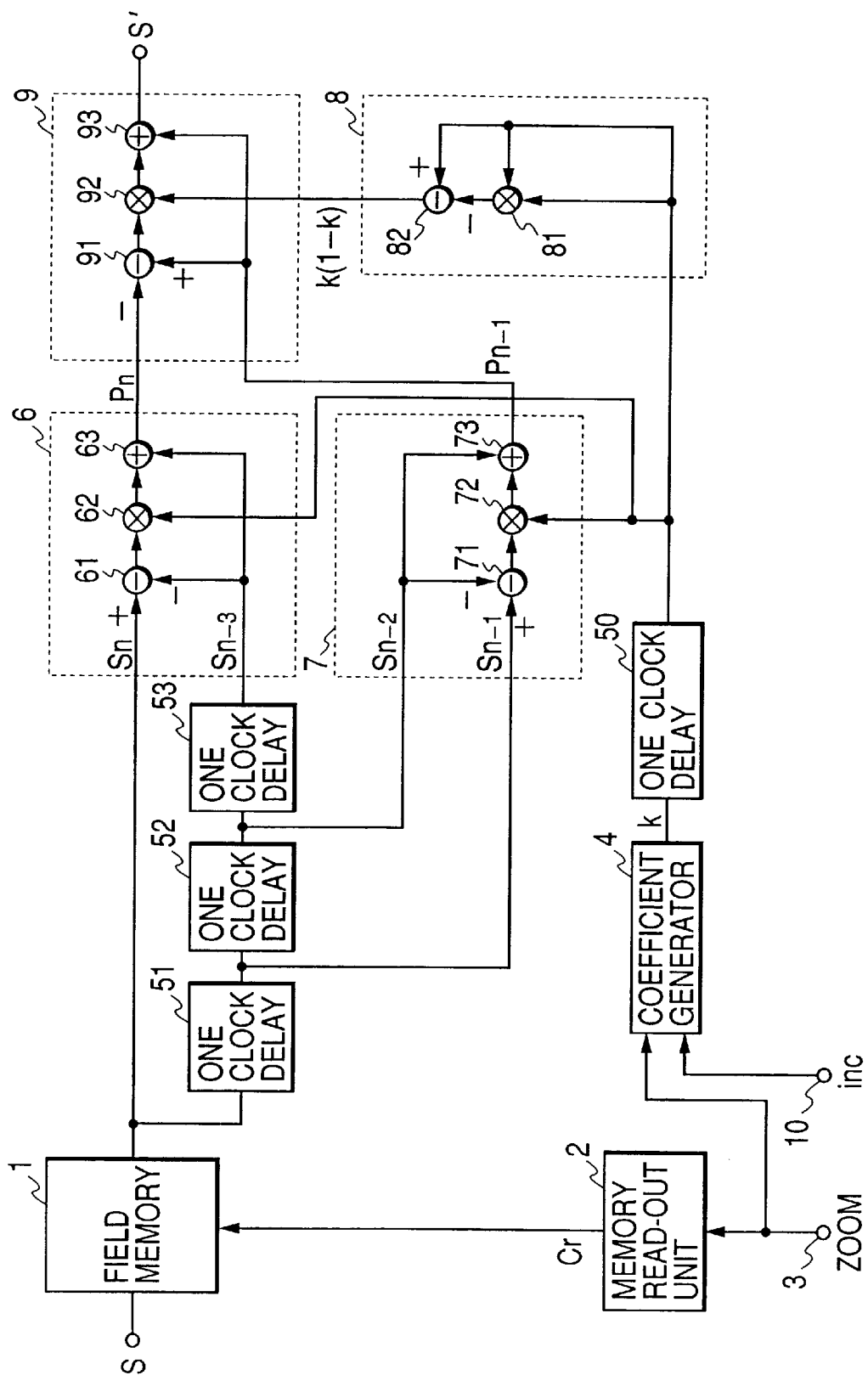
FIG. 8 is a block diagram showing a first embodiment of the third invention.

In the following there will be explained a third embodiment of the present invention, of which configuration is shown in FIG. 8 showing an example of high image quality interpolation utilizing four close points in the horizontal direction.

FIG. 5A is a view schematically showing a part of the image of a field stored in a field memory, which receives the image signal, outputted with a sampling frequency determined by the image pickup element, from an input terminal and stores the image data of one field.

The zoom ratio setting value "zoom" defines the zoom ratio R by $$R=256/(256+zoom)$$

in case the zooming has a resolving power of 8 bits. The image is reduced or enlarged respectively when "zoom" assumes a positive integral value or a negative integral value.

Memory readout means 2 receives the zoom ratio setting value "zoom" from a zoom setting input terminal 3, accordingly determines the position of the interpolated pixel in continuous manner, and supplies a field memory 1 with a readout control signal Cr in such a manner that image data $S_n$ immediately after the position of the interpolated pixel is outputted among the original image data stored in the field memory.

Figure 10:
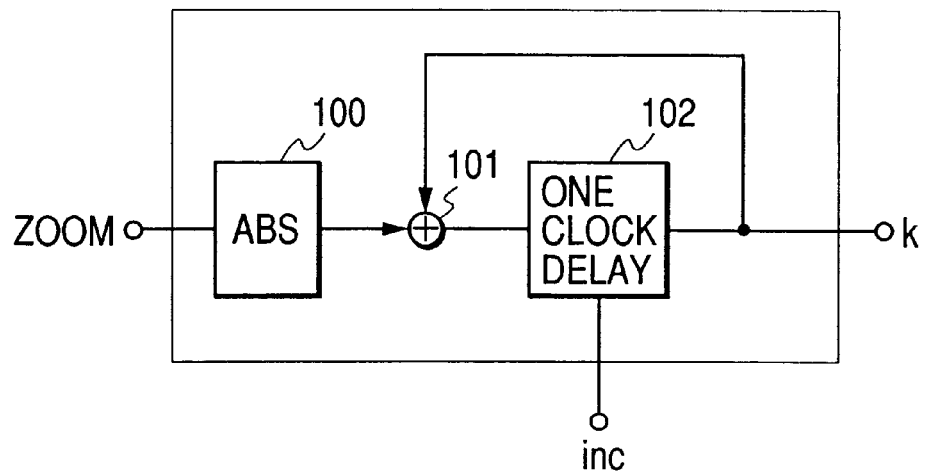
FIG. 10 is a circuit diagram showing an example of the coefficient generator of the third invention.

Also utilizing the zoom ratio setting value "zoom", a coefficient generation circuit 4 generates an interpolation coefficient k based on the relative position in time of the interpolated pixel S' and the original sampling pixel data $S_n$ positioned immediately behind the interpolated pixel S'. The coefficient k is accumulated in succession, without carry over, as indicated by:

$$k=k+|zoom|$$

by an accumulator as shown in FIG. 10, only at the upshift of the inc signal. In this state, the number of bits of the adder coincides with the resolution of zooming.

The interpolation coefficient k outputted from the coefficient generation circuit 4 is delayed, by delay means 50, by a clock internal of the original sampling frequency so as to correspond to the original sampling pixel data $S_n$.

The field memory 1 outputs the pixel data $S_n$ designated by Cr, while the serial delay means 51, 52, 53 outputs pixel data $S_{n-1}$, $S_{n-2}$, $S_{n-3}$ obtained by delaying the pixel data $S_n$ in succession by a clock internal of the original sampling frequency, and the data $S_n$, $S_{n-3}$ are simultaneously supplied at a certain timing to the first interpolation circuit 6, while the data $S_{n-1}$, $S_{n-2}$ are simultaneously supplied to the second interpolation circuit 7. The interpolation coefficient k, delayed by a clock interval of the original sampling frequency, is also entered at the same time.

The interpolation circuit 6 executes a calculation:

$$P_n=(S_{n-3}-S_n)\cdot k+S_{n-3}$$

by a subtractor 61, a multiplier 62 and an adder 63 to output $P_n$, while the interpolation circuit 7 executes a calculation:

$$P_{n-1}=(S_{n-1}-S_{n-2})\cdot k+S_{n-2}$$

by a subtractor 71, a multiplier 72 and an adder 73 to output $P_{n-1}$.

$P_n$ and $P_{n-1}$ are simultaneously entered into a signal synthesis circuit 9 at a certain timing. At the same time, the interpolation coefficient k, delayed by a clock interval of the original sampling frequency, is converted into k·(1−k) by a coefficient converter 8 and entered into the signal synthesis circuit 9 simultaneously with $P_n$, $P_{n-1}$.

The signal synthesis circuit 9 executes a calculation:

$$S'=(P_{n-1}-P_n)\cdot k\cdot(1-k)+P_{n-1}$$

by a subtractor 91, a multiplier 92 and an adder 93 to output an interpolated pixel data S'. The delay means 50 may be suitably dispensed with.

Figure 6:
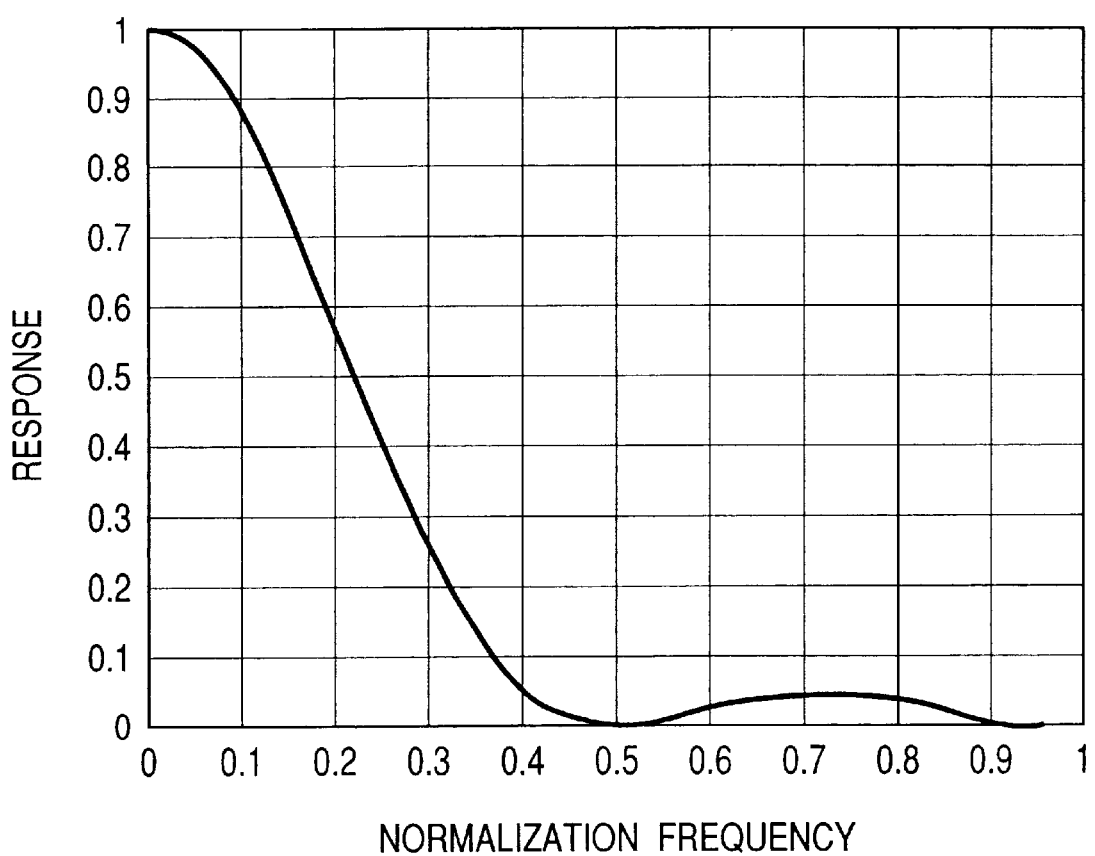
FIG. 6 is a chart showing the frequency characteristics of linear interpolation.
Figure 7:
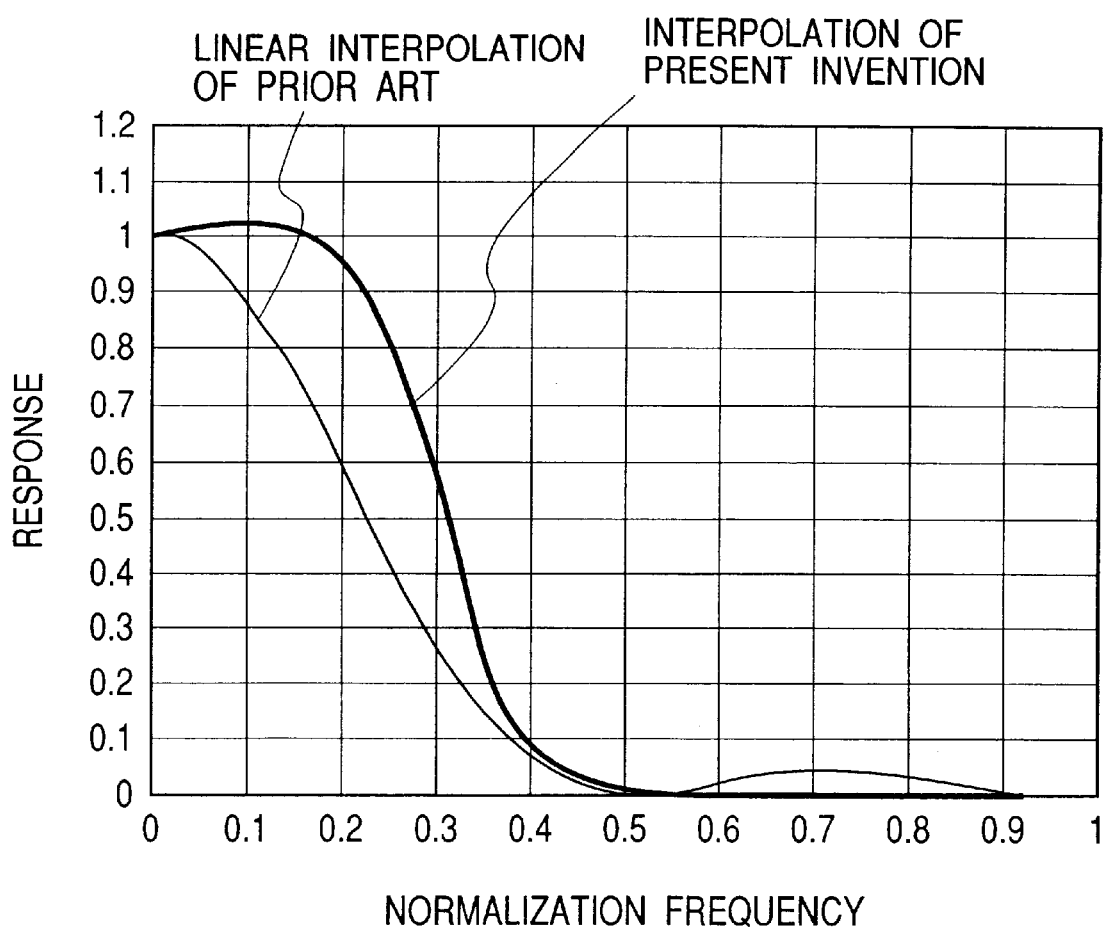
FIG. 7 is a chart showing the comparison in frequency characteristics between linear interpolation and a third invention.

Thus obtained horizontal interpolation pixel data S', showing significantly improved frequency response as shown in FIG. 7 in comparison with the conventional linear interpolation shown in FIG. 6, can provide an enlarged or reduced image with improved definition. Also the interpolation circuits 6, 7 and the signal synthesis circuit 9, being same in configuration as those in the linear interpolation circuit, can be easily realized as a hardware.

Figure 9:
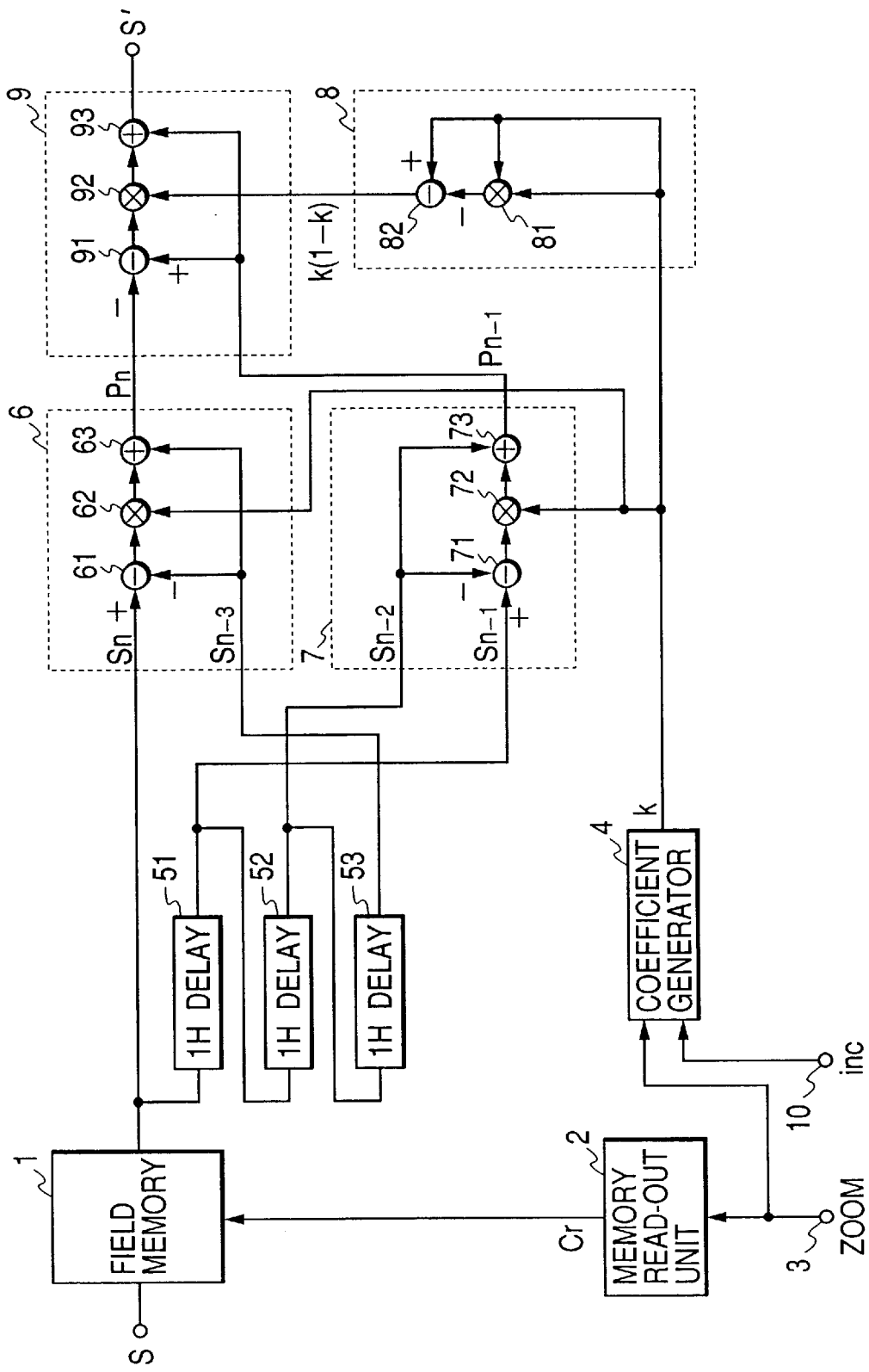
FIG. 9 is a block diagram showing a second embodiment of the third invention.

In the following there will be explained a fourth embodiment of the present invention, of which configuration is shown in FIG. 9 showing an example of high image quality interpolation utilizing four close points in the vertical direction.

Figure 5B:
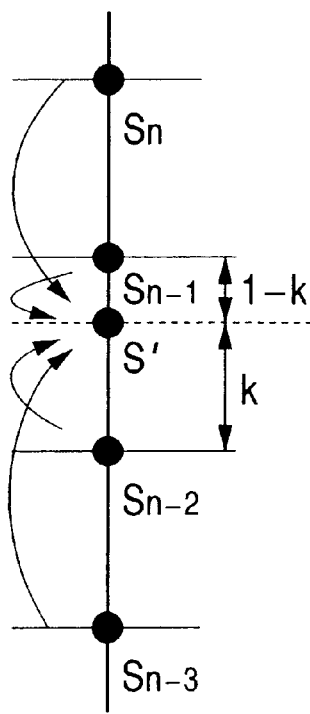
FIG. 5B is a schematic view showing the concept of vertical interpolation according to the present invention.

FIG. 5B is a view schematically showing a part of the image of one field stored in a field memory, which receives the image signal, outputted with a sampling frequency determined by the image pickup element from an input terminal and stores the image data of one field.

The zoom ratio setting value "zoom" defines the zoom ratio R by $$R=256/(256+zoom)$$

in case the zooming has a resolving power of 8 bits. The image is reduced or enlarged respectively when "zoom" assumes a positive integral value or a negative integral value.

Memory readout means 2 receives the zoom ratio setting value "zoom" from a zoom setting input terminal 3, accordingly determines the position of the interpolated pixel in continuous manner, and supplies a field memory 1 with a readout control signal Cr in such a manner that image data $S_n$ immediately after the position of the interpolated pixel is outputted among the original image data stored in the field memory.

Also utilizing the zoom ratio setting value "zoom", a coefficient generation circuits 4 generates an interpolation coefficient k based on the relative position in time of the interpolated pixel S' and the original sampling pixel data $S_n$ positioned immediately behind the interpolated pixel S'. The coefficient k is accumulated in succession, without carry over, as indicated by:

$$k=k+|zoom|$$

by an accumulator as shown in FIG. 10, only at the upshift of the inc signal. In this state, the number of bits of the adder coincides with the resolution of zooming.

The field memory 1 outputs the pixel data $S_n$ designated by Cr, while the serial delay means 51, 52, 53 consisting of line memories outputs pixel data $S_{n-1}$, $S_{n-2}$, $S_{n-3}$ obtained by delaying the pixel data $S_n$ in succession by a scan line period of the original sampling frequency, and the data $S_n$, $S_{n-3}$ are simultaneously supplied at a certain timing to the first interpolation circuit 6, while the data $S_{n-1}$, $S_{n-2}$ are simultaneously supplied to the second interpolation circuit 7. The interpolation coefficient k is also entered at the same time.

The interpolation circuit 6 executes a calculation:

$$P_n = (S_{n-3} - S_n) \cdot k + S_{n-3}$$

by a subtractor 61, a multiplier 62 and an adder 63 to output $P_n$, while the interpolation circuit 7 executes a calculation:

$$P_{n-1} = (S_{n-1} - S_{n-2}) \cdot k + S_{n-2}$$

by a subtractor 71, a multiplier 72 and an adder 73 to output $P_{n-1}$.

$P_n$ and $P_{n-1}$ are simultaneously entered into a signal synthesis circuit 9 at a certain timing. At the same time, the interpolation coefficient k is converted into k·(1−k) by a coefficient converter 8 and entered into the signal synthesis circuit 9 simultaneous with $P_n$, $P_{n-1}$.

The signal synthesis circuit 9 executes a calculation:

$$S' = (P_{n-1} - P_n) \cdot k \cdot (1-k) + P_{n-1}$$

by a subtractor 91, a multiplier 92 and an adder 93 to output an interpolated pixel data S'.

Thus obtained vertical interpolation pixel data S', showing significantly improved frequency response as shown in FIG. 7 in comparison with the conventional linear interpolation as shown in FIG. 6, can provide an enlarged or reduced image with improved definition. Also the interpolation circuits 6, 7 and the signal synthesis circuit 9, being the same in configuration as those in the linear interpolation circuit, can be easily realized as a hardware.

FIGS. 12A and 12B show an image pickup apparatus utilizing the image interpolation circuit and constituting a fifth embodiment of the present invention.

There are shown a CCD 201 constituting a color image pickup element; a timing pulse generation circuit 202 for generating driving timing pulses for the CCD 201 according to a vertical transfer control signal STV; a sample and hold circuit 203 for sampling and holding the output signal of the CCD 201 for obtaining a continuous signal; an AD converter 204 for converting the input analog signal into a digital signal; 1H delay circuits 205, 206 for delaying the input signal by a horizontal scanning period or retaining the current data according to a given write-in control signal WC; a color separation circuit 207 for separating the input signal into color signals R, G, B; a low-pass filter 208; a color signal process circuit 209 for effecting processes of clamping, white balancing, gamma correction, white/dark clipping and color difference matrix process on the input RGB signals to obtain a color signal C; a luminance signal process circuit 210 for effecting processes of clamping, gamma correction, white/dark clipping and edge enhancement to obtain a luminance signal Y; 1H delay circuits 211, 212 for outputting a signal, obtained by delaying the input signal by a horizontal scan period, or terminating the signal readout according to a given readout control signal RC; horizontal interpolation circuits 213, 214 for effecting horizontal 4-point interpolation on the input signal according to a given interpolation coefficient SCH; 3H delay circuits 215, 216 for obtaining output signals delayed respectively by 1, 2 and 3 horizontal scan periods from the input signal; vertical interpolation circuits 217, 218 for effecting vertical interpolation on the input signal according to a given interpolation coefficient SCV; an output 219 of the color signal C; an output 220 of the luminance signal Y; an input terminal 221 for the zoom ratio "zoom"; a vertical coefficient generator 222 for generating the vertical transfer control signal STV, the write-in control signal WC for the 1H delay circuits 205, 206 and the interpolation coefficient SCV for the vertical interpolation circuits 217, 218 according to the entered zoom ratio "zoom"; and a horizontal coefficient generator 223 for generating the readout control signal RC for the 1H delay circuits 211, 212, and the interpolation coefficient SCH for the horizontal interpolation circuits 213, 214 according to the entered zoom ratio "zoom".

The image of an unrepresented object is focused by an unrepresented image taking optical system on the image receiving face of the CCD 201 and is photoelectrically converted. The charges obtained by the photoelectric conversion are transferred in the vertical and horizontal directions according to the drive timing pulses generated by the timing pulse generator 202. In these operations, when the vertical transfer control pulses STV is generated, the timing pulse generator 202 does not output the pulses for vertical transfer in the CCD 201, so that the vertical charge transfer therein is not conducted. As an example, in case of image enlargement with a magnification of 2, after the readout of the photoelectrically converted charges for a horizontal scan period, the vertical transfer is not executed in the next horizontal scan period, so that the charges are not read out. These cycles are repeated in succession. The charges transferred in the above-explained manner are converted into a voltage in the output unit of the CCD 201, whereby an image pickup signal is outputted.

This image signal is made continuous by the sample and hold circuit 203, then converted into a digital signal by the AD converter 204 and supplied to the 1H delay circuit 205.

The output signal, delayed by a horizontal scan period in the 1H delay circuit 205, is supplied to the color separation circuit 207 and the low-pass filter 208, and also supplied to the 1H delay circuit 206 for a further delay by a horizontal scan period.

When the vertical transfer in the CCD 201 is suspended as explained in the foregoing, the vertical coefficient generator 222 generates the write-in control signal WC whereby the write-in operation is not conducted in the 1H delay circuits 205, 206 but the same signal is read out also in the next horizontal scan period.

The color separation circuit 207 receives the output signal of the 1H delay circuits 205, 206. The configuration of the color separation circuit 207 varies according to the configuration of the color mosaic filters on the image pickup face of the CCD 201, but, in case of the commonly employed configuration composed of repetition of yellow, cyan, green and magenta filters with interlaced signal readout, the R, G and B signals can be obtained by processing the signals of two horizontal scan periods. Such RGB signals are subjected to the aforementioned process in the color signal process circuit 209 to obtain a color signal C, which is outputted in a format suitable for the subsequent digital processing, such as time-shared multiplex signals Cr, Cb.

The low-pass filter 208 is so selected as to extract the luminance signal by eliminating the color carriers generated by the mosaic color filters of the CCD 201. The output of the low-pass filter is subjected to the aforementioned process in the luminance signal process circuit 210 to obtain the luminance signal Y.

The signal C, Y thus obtained are at first supplied to the 1H delay circuits 211, 212 in which the input signal written thereinto is delayed by a horizontal scan period and is read according to the readout control signal RC generated by the horizontal coefficient generator 223. The outputs of the 1H delay circuits 211, 212 are respectively supplied to the horizontal interpolation circuits 213, 214, which execute the 4-point interpolation in the horizontal direction according to the interpolation coefficient SCH generated by the horizontal coefficient generator 223.

The outputs of the horizontal interpolation circuits 213, 214 are respectively supplied to the 3H delay circuits 215, 216, which respectively generate outputs formed by delaying the input signal by 1H, 2H and 3H, and such outputs are supplied, together with the undelayed signal, to the vertical interpolation circuits 217, 218.

The vertical interpolation circuits 217, 218 execute the 4-point interpolation based on the entered four signals and according to the interpolation coefficient SCV generated by the vertical coefficient generator 222, to output the interpolated signals through the color signal output terminal 219 and the luminance signal output terminal 220 to an external equipment such as an unrepresented video cassette recorder or a television monitor.

The zoom ratio "zoom", set by setting means such as a zooming variable resistor or a zooming switch, is entered from the input terminal 21 and is supplied to the vertical coefficient generator 222 and the horizontal coefficient generator 223. According to the entered "zoom" signal, the vertical coefficient generator 222 generates the vertical transfer control signal STV for the timing pulse generator 202, the write-in control signal WC for the 1H delay circuits 205, 206 and the interpolation coefficient SCV for the vertical interpolation circuits 217, 218 thereby forming an image signal enlarged or reduced with a predetermined magnification in the vertical direction.

Also according to the entered "zoom" signal, the horizontal coefficient generator 223 generates the readout control signal for the 1H delay circuits 211, 212, and the interpolation coefficient SCH for the horizontal interpolation circuits 213, 214, thereby forming an image signal enlarged or reduced with a predetermined magnification in the horizontal direction.

Figure 13:
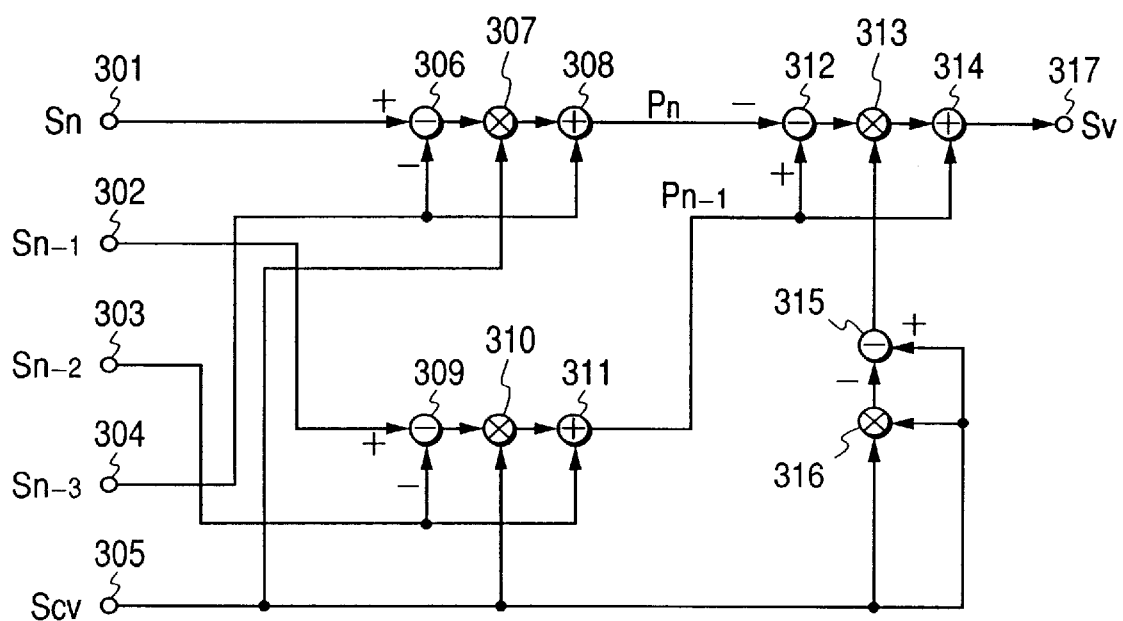
FIG. 13 is a circuit diagram showing an example of the vertical interpolation circuit.

FIG. 13 is a circuit diagram showing a detailed example of the vertical interpolation circuit 218 in the present embodiment, wherein shown are input terminals 301, 302, 303, 304, 305; subtractors 306, 309, 312, 315; multipliers 307, 310, 313, 316; adders 308, 311, 314; and an output terminal 317. The input terminal 301 receives the output signal $S_n$ of the horizontal interpolation circuit 214 shown in FIG. 12B. The input terminal 302 receives the 1H delayed signal $S_{n-1}$ among the outputs of the 3H delay circuit 216, while the input terminal 303 receives the 2H delayed signal $S_{n-2}$ among the above-mentioned outputs, and the input terminal 304 receives the 3H delayed signal $S_{n-3}$ among the above-mentioned outputs. The input terminal 305 receives the interpolation coefficient SCV among the outputs of the vertical coefficient generator 222.

The signals $S_n$ and $S_{n-3}$ are subjected to subtraction by the subtractor 306, and the obtained result is multiplied by the SCV in the multiplier 307, of which output is added with $S_{n-3}$ in the adder 308 to obtain the signal $P_n$.

Taking the value of SCV as K, the signal $P_n$ is a weighted average of $S_n$ and $S_{n-3}$ respectively weighted by K and (1−K).

The signals $S_{n-1}$ and $S_{n-2}$ are subjected to subtraction by the subtractor 309, and the obtained result is multiplied by the SCV in the multiplier 310, of which output is added with $S_{n-2}$ in the adder 311 to obtain the signal $P_{n-1}$.

The signal $P_{n-1}$ is a weighted average of $S_{n-1}$ and $S_{n-2}$ respectively weighted by K and (1−K). The signals $P_n$ and $P_{n-1}$ are subjected to subtraction by the subtractor 312, and the obtained result is multiplied by the $SCV_2$ to be explained later in the multiplier 313, of which output is added with $P_{n-1}$ in the adder 314 to output the vertically interpolated luminance signal $S_v$ from the luminance signal output terminal 317.

The entered SCV is multiplied in the multiplier 316 with the SCV itself, and SCV itself is subtracted from the obtained result to provide $SCV_2$, which is supplied to the multiplier 313 as explained above.

The vertical interpolation circuit 217 can have the same configuration as that shown in FIG. 13.

Figure 14:
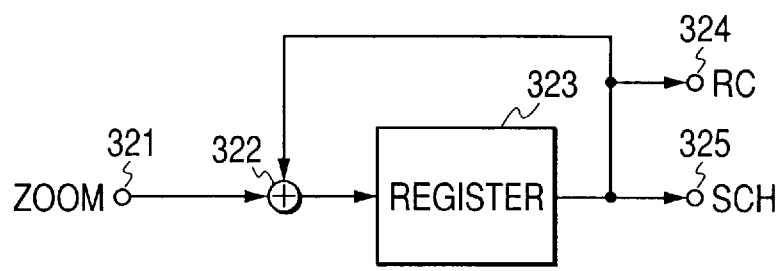
FIG. 14 is a circuit diagram showing an example of the horizontal coefficient generator.

FIG. 14 is a detailed circuit diagram showing an example of the horizontal coefficient generator 223 in the present embodiment.

There are provided an input terminal 321 for receiving the zoom coefficient entered from the zoom coefficient input terminal 221; an adder 322; a register 323; an output terminal 324 for the readout control signal RC; and an output terminal 325 for the interpolation coefficient SCH.

The zoom coefficient entered from the input terminal 321 is added, in the adder 322, with a signal obtained by excluding the most significant bit from the output of the register 323, and the obtained output is retained in the register 323. The data in the register 323 is renewed at each clock signal. The register 323 supplies the adder 322 with the out signal excluding the most significant bit as explained in the foregoing, and also outputs the most significant bit as the readout control signal RC from the output terminal 324 and outputs the value excluding the most significant bit as the interpolation coefficient SCH from the output terminal 325. For example in case SCH is composed of 8 bits and RC is composed of 1 bit, the register 323 has a capacity of 9 bits. The zoom coefficient is of 9 bits, and is assumed to have a value 256 in case of a zoom magnification of 1. In this state, because of addition of 256 in the adder 322, the lower 8 bits are always 0 while the most significant bit always becomes 1. The register 323 retains these values, whereby RC always becomes 1 and SCH always becomes 0, so that the data are always read from the 1H delay circuits while the horizontal interpolation circuits do not execute the interpolating operation. Consequently the image data are not enlarged in the horizontal direction and the magnification becomes unity.

Also in case of a zoom ratio of about 2, the "zoom" signal assumes a value 128, whereby the content of the register 323 varies in the order of 0, 128, 256, 128 and 256. The value of the uppermost value varies in the order of 0, 0, 1, 0 and 1, so that a pixel is read in a period of every two pixels, and the coefficient varies in the order of 0, 0.5, 0, 0.5 and 0.

The vertical coefficient generator 222 can also be realized with an equivalent configuration, in consideration of a fact that a pixel is displaced by a horizontal scan period in the vertical direction.

Figure 15:
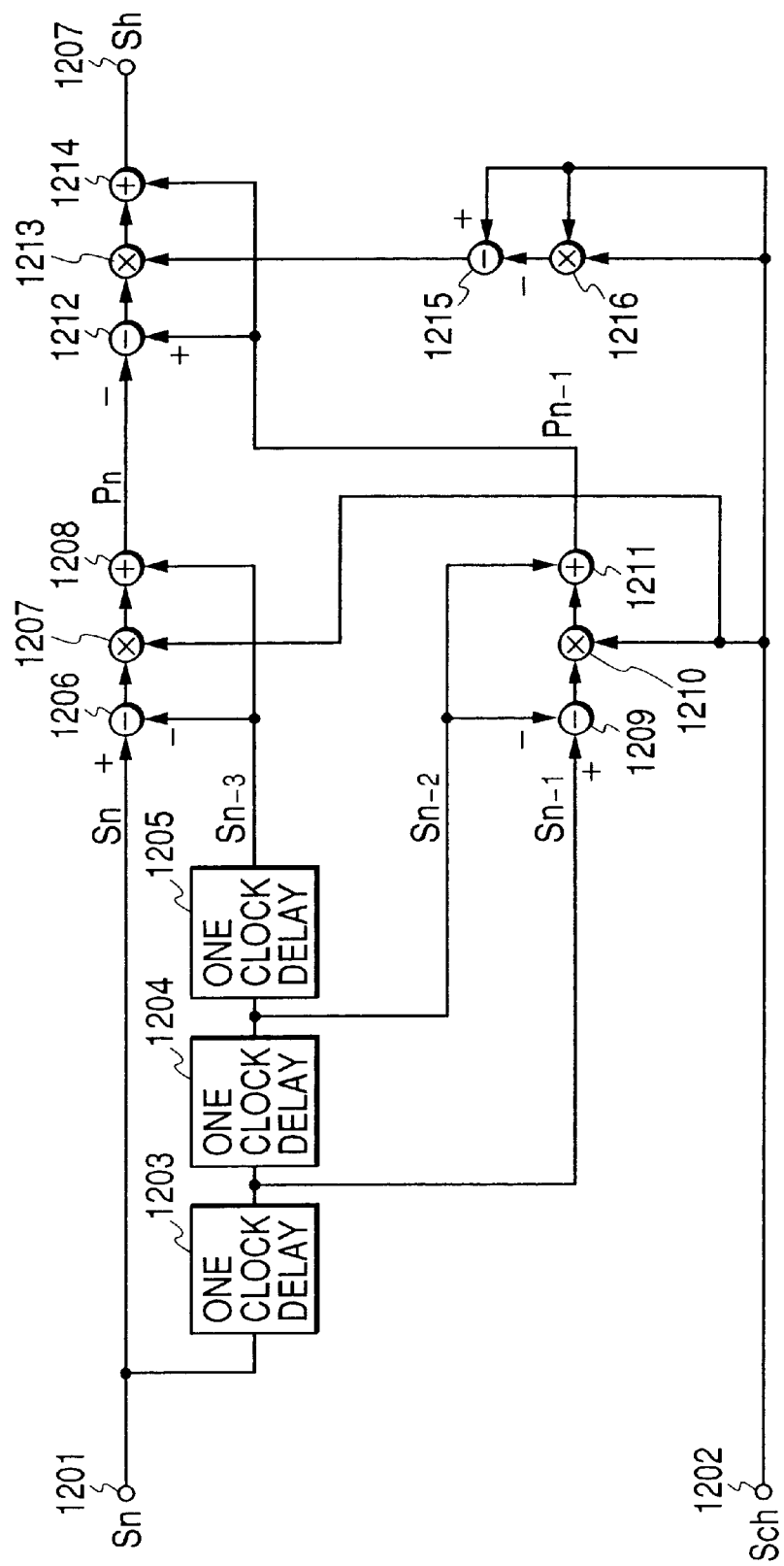
FIG. 15 is a circuit diagram showing a detailed example of the horizontal interpolation circuit.

FIG. 15 is a detailed circuit diagram showing an example of the horizontal interpolation circuit 214 in the present embodiment, wherein provided are input terminals 1201, 1202; 1-clock delay circuits 1203, 1204, 1205 for a pixel delay; subtractors 1206, 1209, 1212, 1215; multipliers 1207, 1210, 1213, 1216; adders 1208, 1211, 1215; and an output terminal 1201.

The input terminal 1201 receives the output signal $S_n$ of the 1H delay circuit 212 shown in FIG. 12B. The input terminal 1202 receives the interpolation coefficient $S_{ch}$ from the horizontal coefficient generator 223. The entered $S_n$ is delayed respectively by a pixel in the 1-clock delay circuits 1203, 1204, 1205 to provide respective outputs $S_{n-1}$, $S_{n-2}$, $S_{n-3}$.

The signals $S_n$ and $S_{n-3}$ are subjected to subtraction by the subtractor 1206, and the obtained result is multiplied by the $S_{ch}$ in the multiplier 1207, of which output is added with $S_{n-3}$ in the adder 1208 to obtain the signal $P_n$.

Also the signals $S_{n-1}$ and $S_{n-2}$ are subjected to subtraction by the subtractor 1209, and the obtained result is multiplied by the SCV in the multiplier 1210, of which output is added with $S_{n-2}$ in the adder 1211 to obtain the signal $P_{n-1}$.

The signals $P_n$ and $P_{n-1}$ are subjected to subtraction by the subtractor 1212, and the obtained result is multiplied by the $S_{ch2}$ to be explained later in the multiplier 1213, of which output is added with $P_{n-1}$ in the adder 1214 to output the horizontally interpolated luminance signal $S_h$ from the luminance signal output terminal 1207.

The entered $S_{ch}$ is multiplied in the multiplier 1216 with the $S_{ch}$ itself, and $S_{ch}$ itself is subtracted from the obtained result to provide $S_{ch2}$, which is supplied to the multiplier 1213 as explained above.

The configuration of the horizontal interpolation circuit 1213 can be substantially similar to that shown in FIG. 15, except that the 1-clock delay circuits are replaced by 2-clock delay circuits since the color signal consists of point-sequential Cr, Cb signals and that the coefficient is halved because the distance of the pixel is doubled.

Figure 16B:
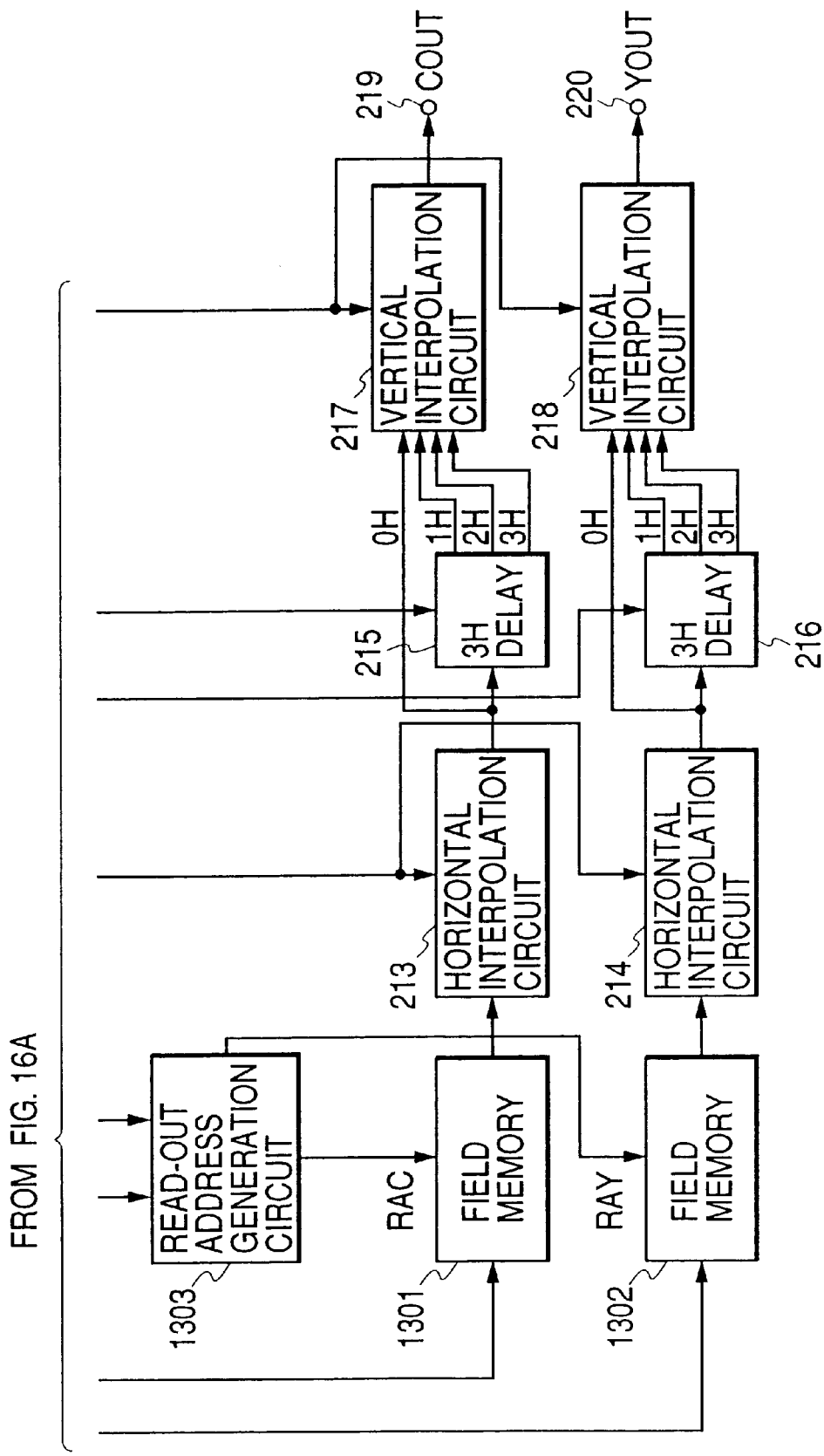
FIG. 16 which is composed of FIGS. 16A and 16B are block diagrams showing a sixth embodiment of the present invention.

FIGS. 16A and 16B show a sixth embodiment of the present invention, herein components same as or equivalent to those in the foregoing drawings are represented by same numbers.

There are provided field memories 1301, 1302; and a readout address generator 1303.

The signals C and Y are entered into the field memories 1301, 1302, in which the written input signals are delayed by a field period and are read according to readout addresses RAC, RAY generated by the readout address generating circuit 1303. The readout addresses RAC, RAY are respectively controlled by a vertical readout control signal RCV generated by the vertical coefficient generator 222 and a horizontal readout control signal RCH generated by the horizontal coefficient generator, thus generating a readout address according to the value entered from the zoom coefficient input terminal 221. As an example, if the zoom coefficient represents an enlargement of 2 times, the readout is so controlled that one pixel is read in a period of every two pixels in each of the horizontal and vertical directions.

The outputs of the field memories 1301, 1302 are respectively supplied to the horizontal interpolation circuits 213, 214, which execute the 4-point interpolation in the horizontal direction according to the interpolation coefficient SCH generated by the horizontal coefficient generator 223.

As explained in the foregoing, according to the entered "zoom" signal, the vertical coefficient generator 222 generates the vertical readout control signal RCV for controlling the readout address generator 1303 and the 3H delay circuit 215, and the interpolation coefficient SCV for the vertical interpolation circuits 217, 218, thereby forming an image signal enlarged or reduced with a predetermined magnification in the vertical direction.

Also, according to the entered "zoom" signal, the horizontal coefficient generator 223 generates the horizontal readout control signal RCH for the readout address generator 1303, and the interpolation coefficient SCH for the horizontal interpolation circuits 213, 214, thereby forming an image signal enlarged or reduced with a predetermined magnification in the horizontal direction.

Figure 17B:
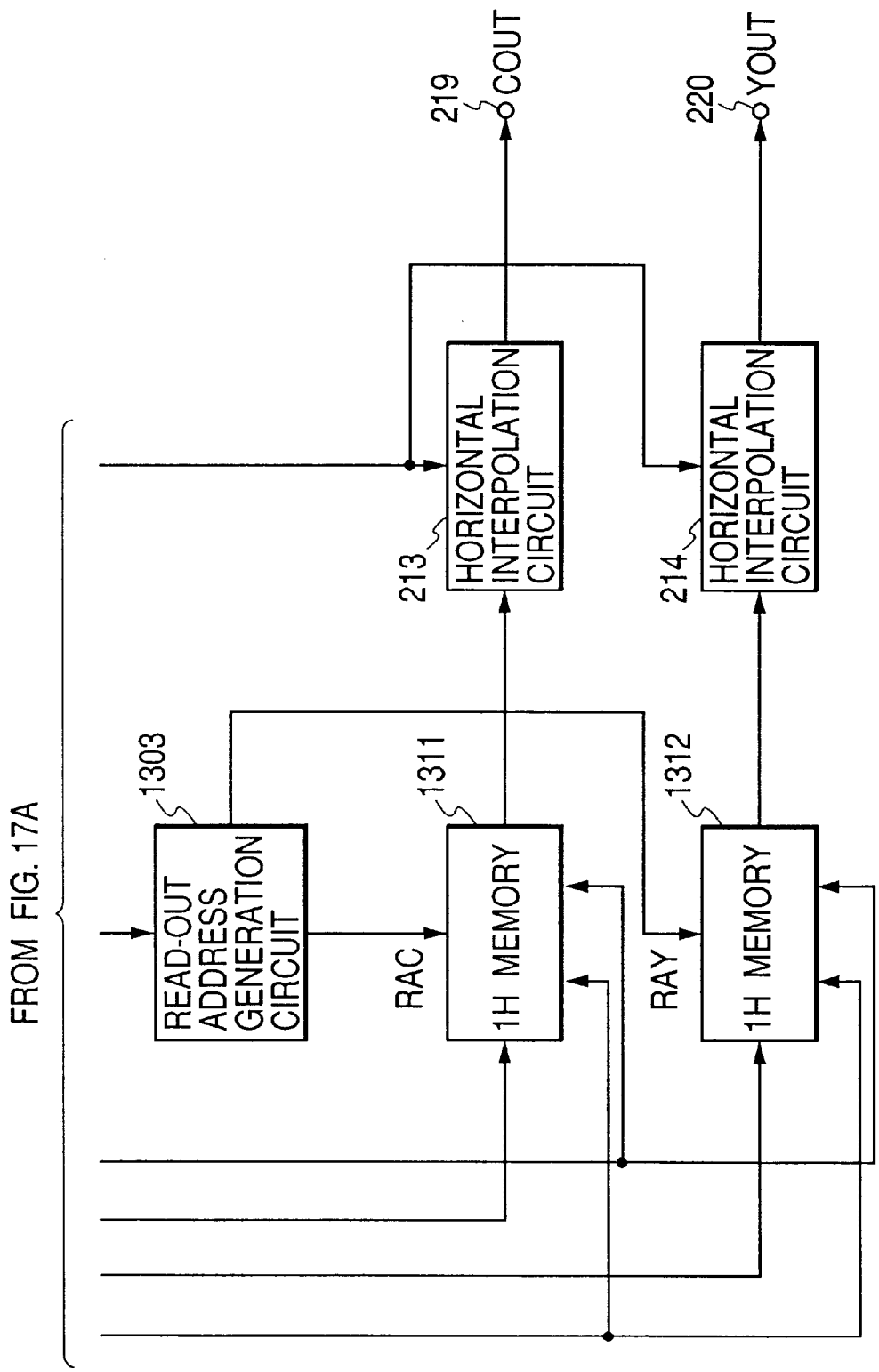
FIG. 17 which is composed of FIGS. 17A and 17B are block diagrams showing a seventh embodiment of the present invention.

FIGS. 17A and 17B show a sixth embodiment of the present invention.

There are provided a clock generator 1310 for generating clock signals of a frequency different from that of the timing pulses; and 1H memories 1311, 1312 having a capacity of a horizontal scan period, of so-called dual port type in which the input signals are written continuously in synchronization with write-in clock signals while the output signals are read according to read-out clock signals and according to readout addresses.

The signal flow from the CCD 201 to the end of the color signal process circuit 209 and of the luminance signal process circuit 210 is the same as that in the foregoing embodiments.

The output C of the color signal process circuit 209 and the output Y of the luminance signal process circuit 210 are entered into the 1H memories 1311, 1312.

In the 1H memories 1311, 1312, the signal writing is executed in continuous manner in synchronization with a clock signal CK1, which is synchronized with the horizontal transfer clock signal of the CCD 201, generated by the timing pulse generator 203.

The signal readout is executed according to the readout addresses RAC, RAY generated in the readout address generator according to a clock signal CK2 generated by the clock generator 1310 with a frequency different from that of the clock signal CK1 and also to the horizontal readout control signal RCH generated by the horizontal coefficient generator 223.

These operations are conducted in the following manner. For the purpose of simplicity, the following explanation will be given solely on the luminance signal.

Taking the ratio of the frequency FCK2 of the clock signal CK2 to that FCK1 of the clock signal CK1 as K (=FCK2/FCK1), the readout address RAY is generated in such a manner that the 1H memory 1312 has a readout clock frequency of FCK2 and a readout data rate equal to FCK1. The horizontal interpolation circuit 214 receives the signal read from the 1H memory 1312, synchronized with CK2 and having a data rate of FCK1 as explained above, effects horizontal interpolation by K times and outputs thus interpolated signal. Therefore, the luminance signal outputted from the output terminal 220 has a data rate FCK2.

As an example, in case K is 5/4, the output from the 1H memory 1312 is synchronized with the frequency FCK2 and contains 4 data in every 5 clocks. Stated differently, a same data is released twice in every 5 clock signals. Based on such output data, the horizontal interpolation circuit 1214 executes the 4-point interpolation, thereby generating 5 interpolated data. Consequently the output of the horizontal interpolation circuit 1214 has a clock frequency and a data rate both equal to FCK2.

FIGS. 18A and 18B show a seventh embodiment of the present invention.

There are provided field memories 1320, 1321 of a type effecting the signal write-in according to write-in addresses and the signal read-out in the sequential scanning method; and a write-in address generator 1322 for generating the write-in address for the field memories.

The signal flow from the CCD 201 to the end of the color signal process circuit 209 and of the luminance signal process circuit 210 is the same as that in the foregoing embodiments.

The output C of the color signal process circuit 209 and the output Y of the luminance signal process circuit 210 are entered into the 3H delay circuits 215, 216.

The 3H delay circuits 215, 216 respectively output signals delayed by 1, 2 and 3 horizontal scan periods, which are respectively entered, together with the input signal, into the vertical interpolation circuits 217, 218.

The vertical interpolation circuits 217, 218 effect pixel interpolation in the vertical direction by the aforementioned 4-point interpolating method, according to the interpolation coefficient SCV generated by the vertical coefficient generator 222, and send outputs to the horizontal interpolation circuits 213, 214, which effect pixel interpolation in the horizontal direction by the aforementioned 4-point interpolating method, according to the interpolation coefficient SCH generated by the horizontal coefficient generator 223 and send outputs to the field memories 1320, 1321.

In the field memory 1321, the input signal is written according to a write-in address WAY effect pixel interpolation in the vertical direction by the aforementioned 4-point interpolating method, according to the interpolation coefficient SCV generated by the horizontal coefficient generator WAY generated by the write-in address generator 1322. The address WAY is so generated that a reduced image is written into the field memory according to the zoom ratio entered through the zoom ratio input terminal 221.

As an example, in case the zoom ratio is an image reduction of ½, an address is generated for every two pixels in the horizontal direction while a same address is generated for two line periods in the vertical direction, whereby the image is reduced to ½ on the field memory.

In case the zoom ratio is between 1 and ½, after the interpolation in the vertical and horizontal directions by the vertical interpolation circuit 218 and the horizontal interpolation circuit 214, the signal writing is executed under the control of increase of address according to the zoom ratio, whereby the image in the field memory is reduced according to the zoom ratio.

Also the field memory 1320 functions substantially similarly as explained in the foregoing, but, in the color signal, the data of two pixels are processed as a group since the color signal is multiplexed in time.

From the field memories 1320, 1321, the color signal and the luminance signal of the reduced image are obtained by successively reading the image written by the aforementioned operation, and are respectively outputted from the output terminals 219, 220.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

an image pickup element; and an image processing unit adapted to form, based on the image data of four pixel points arranged in a line in a predetermined direction, interpolated image data of a position located on the line and between the four pixel points, wherein said image processing unit forms the interpolated image data on the basis of a weighted average value of the image data of a predetermined two of the four pixel points and a weighted average value of the image data of the other two of the four pixel points.

2. An image pickup apparatus according to claim 1, wherein the algorithm employed for the interpolation comprises, for data D0, D1, D2 and D3 of four adjacent pixels in which the position to be interpolated is located between D1 and D2 and a ratio K is defined by the distance between such position and D1 divided by the distance between D1 and D2, at first determining two average values weighted with K and (1−K) respectively for the former and latter data in each of two combinations of D0, D3 and D1, D2 and using these two average values for determining the image data at said position to be interpolated.

3. An image pickup apparatus according to claim 1, wherein the predetermined direction is one of the horizontal direction and the vertical direction.

4. An image interpolating apparatus comprising:

a memory for storing digital image signal;

memory readout means for reading pixel data in succession from said memory;

first, second and third consecutive delay means for respectively delaying the image signal $S_n$, read by said memory readout means, to respectively form pixel signals $S_{n-1}$, $S_{n-2}$, where the signals $S_n$, $S_{n-1}$, $S_{n-2}$, $S_{n-3}$ correspond respectively to pixel data arranged in a line in the predetermined direction of an image;

first, second, third and fourth coefficient generation circuits for generating interpolation coefficients respectively corresponding to the pixel signals $S_n$, $S_{n-2}$, $S_{n-3}$ and determined by the N-th order functions from the position of the interpolated pixel S' positioned between the pixel signals $S_{n-1}$ and $S_{n-2}$; and a signal synthesis circuit for calculating the sum of respective product of pixel signal $S_n$ and interpolation coefficient $k_n$.

5. An image interpolating apparatus according to claim 4, wherein said delay means has a delay amount corresponding to a clock internal of the original sampling frequency before the interpolation and is adapted to effect interpolation in the horizontal direction.

6. An image interpolating apparatus according to claim 4, wherein said delay means has a delay amount corresponding to a scanning line of the original sampling frequency before the interpolation and is adapted to effect interpolation in the vertical direction.

7. An image interpolating apparatus according to claim 4, wherein said coefficient generation circuit is adapted to renew the interpolation coefficient in response to a renewal control signal for the original sampling pixels for generating the interpolated pixel.

8. An image interpolating apparatus comprising:

a memory for storing digital image signal;

memory readout means for reading pixel data in succession from said memory;

first, second and third consecutive delay means for respectively delaying the image signal $S_n$, read by said memory readout means, to respectively form pixel signals $S_{n-1}$, $S_{n-2}$, $S_{n-3}$, where the signals $S_n$, $S_{n-1}$, $S_{n-2}$, $S_{n-3}$ correspond respectively to pixel data arranged in a line in the predetermined direction of an image;

first and second coefficient generation circuits for generating interpolation coefficient $k_1$, $k_2$ determined by N-th order functions from the position of the interpolated pixel S' positioned between the pixel signals $S_{n-1}$ and $S_{n-2}$;

first and second interpolation circuits for executing a calculation $P = k_1 \cdot S_x + (1 - k_1) \cdot Sy$ on two arbitrary pixel signals $S_x$, $S_y$; and a signal synthesis circuit;

wherein the pixel signals $S_n$, $S_{n-3}$ are entered into said first interpolation circuit while the pixel signals $S_{n-1}$, $S_{n-2}$ are entered into said second interpolation circuit and said first and second interpolation circuits execute interpolation with the interpolation coefficient $k_1$, while the outputs $P_n$, $P_{n-1}$ of said first and second interpolation circuits are entered into said signal synthesis circuit, which outputs the interpolated pixel signal S' based on an equation $k_2 \cdot (P_{n-1} - P_n) + P_{n-1}$ utilizing the interpolation coefficient $k_2$.

9. An image interpolating apparatus according to claim 8, wherein said delay means has a delay amount corresponding to a clock internal of the original sampling frequency before the interpolation and is adapted to effect interpolation in the horizontal direction.

10. An image interpolating apparatus according to claim 8, wherein said delay means has a delay amount corresponding to a scanning line of the original sampling frequency before the interpolation and is adapted to effect interpolation in the vertical direction.

11. An image interpolating apparatus according to claim 8, wherein said coefficient generation circuit is adapted to renew the interpolation coefficient in response to a control signal for renewing the original sampling pixels for generating the interpolated pixel.

12. An image interpolating apparatus comprising:

a memory for storing digital image signal;

memory readout means for reading pixels in succession from said memory;

first, second and third consecutive delay means for respectively delaying the image signal $S_n$ read by said memory readout means, to respectively form pixel signals $S_{n-1}$, $S_{n-2}$, $S_{n-3}$, where the signals $S_n$, $S_{n-1}$, $S_{n-2}$, $S_{n-3}$ correspond respectively to pixel data arranged in a line in the predetermined direction of an image;

a coefficient generation circuit for determining, by an accumulator, an interpolation coefficient k indicating the position of the interpolated pixel S' positioned between the pixel signals $S_{n-1}$ and $S_{n-2}$ based on the pixel signals $S_n$, $S_{n-1}$, $S_{n-2}$, $S_{n-3}$;

first and second interpolation circuits for executing a calculation $P=k_1 \cdot S_x+(1-k) \cdot S_y$ on two arbitrary pixel signals $S_x$, $S_y$; and a signal synthesis circuit;

wherein the pixel signals $S_n$, $S_{n-3}$ are entered into said first interpolation circuit while the pixel signals $S_{n-1}$, $S_{n-2}$ are entered into said second interpolation circuit and said first and second interpolation circuits execute interpolation with the interpolation coefficient k, while the outputs $P_n$, $P_{n-1}$ of said first and second interpolation circuits are A entered into said signal synthesis circuit, which outputs the interpolated pixel signal S' based on an equation $M \cdot (P_{n-1}-P_n)+P_{n-1}$ in which M is a coefficient derived from the interpolation coefficient k by $M=k \cdot (1-k)$.

13. An image interpolating apparatus according to claim 12, wherein said delay means has a delay amount corresponding to a clock internal of the original sampling frequency before the interpolation and is adapted to effect interpolation in the horizontal direction.

14. An image interpolating apparatus according to claim 12, wherein said delay means has a delay amount corresponding to a scanning line of the original sampling frequency before the interpolation and is adapted to effect interpolation in the vertical direction.

15. An image interpolating apparatus according to claim 12, wherein said accumulator of the coefficient generation circuit consists of a cumulative adder of a width of n bits in case the interpolated point generated between the original sampling pixels has a resolution of $2^n$ bits, and is adapted to execute cumulative addition of the constant representing the interpolation ratio with a width of n bits in response to a control signal for renewing the original sampling pixels for generating the interpolated pixel.

16. An image processing apparatus comprising:

an input part which inputs an output signal of an image pickup element; and an image processing unit adapted to form, based on the image data of four pixel points arranged in a line in one predetermined direction, interpolated image data of a position located on the line and between the four pixel points, wherein said image processing unit forms the interpolated image data on the basis of a weighted average value of the image data of a predetermined two of the four pixel points and a weighted average value of the image data of the other two of the four pixel points.

17. An image processing apparatus according to claim 16, wherein an algorithm employed for the interpolation comprises, for data D0, D1, D2, and D3 of four adjacent pixels in which the position to be interpolated is located between D1 and D2, and where a ratio K is defined by the distance between said position and D1 divided by the distance between D1 and D2, the functions of (i) at first determining two average values weighted with K and (1−K), respectively, for the former and latter data in each of two combinations of D0, D3 and D1, D2, and (ii) using these two average values for determining the image data at said position to be interpolated.

18. An image pickup method comprising:

an image pickup step of picking up an object image with an image pickup element; and an image processing step of enlarging or reducing an image represented by an output signal of said image pickup element in a predetermined direction, wherein the enlargement or reduction conducted in said image processing step forms, based on the image data of four pixel points mutually adjacent in a line in the predetermined direction, interpolated image data of a position located on the line and between the four pixel points, and wherein the interpolated image data is formed on the basis of a weighted average value of the image data of a predetermined two of the four pixel points and a weighted average value of the image data of the other two of the four pixel points.

19. An image pickup method according to claim 18, wherein an algorithm employed for the interpolation comprises, for data D0, D1, D2, and D3 of four adjacent pixels in which the position to be interpolated is located between D1 and D2, and where a ratio K is defined by the distance between said position and D1 divided by the distance between D1 and D2, the steps of (i) at first determining two average values weighted with K and (1−K), respectively, for the former and latter data in each of two combinations of D0, D3 and D1, D2, and (ii) using these two average values for determining the image data at said position to be interpolated.

20. An image pickup method according to claim 18, wherein the predetermined direction is one of the horizontal direction and the vertical direction.

* * * * *

UNITED STATES PATENT AND TRADEMARK OFFICE
CERTIFICATE OF CORRECTION

PATENT NO. : 6,631,216 B2
DATED : October 7, 2003
INVENTOR(S) : Teruo Hieda et al.

It is certified that error appears in the above-identified patent and that said Letters Patent is hereby corrected as shown below:

Column 6,
Line 7, "in" should read -- in a --.

Column 8,
Line 40, "in" should read -- in a --.
Line 47, "circuits" should read -- circuit --.

Column 14,
Line 9, "executed in" should read -- executed in a --.

Column 16,
Line 8, "$S_{n-2}$," should read -- $S_{n-2}$, $S_{n-3}$, --.
Line 13, "$S_n$," should read -- $S_n$, $S_{n-1}$, --.

Column 17,
Line 41, "A" should be deleted.

Signed and Sealed this

Twenty-ninth Day of June, 2004

JON W. DUDAS
*Acting Director of the United States Patent and Trademark Office*